US008548879B2

(12) United States Patent
Shiner et al.

(10) Patent No.: US 8,548,879 B2
(45) Date of Patent: Oct. 1, 2013

(54) MATERIALS MANAGEMENT SYSTEM

(75) Inventors: James R. Shiner, Puyallup, WA (US); John W. Curphey, San Francisco, CA (US); Thanh D. Hoang, Edgewood, WA (US); Christian K. Fischer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1577 days.

(21) Appl. No.: 11/956,664

(22) Filed: Dec. 14, 2007

(65) Prior Publication Data

US 2009/0157532 A1 Jun. 18, 2009

(51) Int. Cl.
*G06Q 40/00* (2012.01)

(52) U.S. Cl.
USPC .......................................................... 705/28

(58) Field of Classification Search
USPC .......................................................... 705/28
See application file for complete search history.

(56) References Cited

U.S. PATENT DOCUMENTS

| | | | |
|---|---|---|---|
| 6,125,312 A * | 9/2000 | Nguyen et al. | 701/35 |
| 6,567,729 B2 | 5/2003 | Betters et al. | |
| 6,732,027 B2 | 5/2004 | Betters et al. | |
| 7,689,329 B2 | 3/2010 | Avery et al. | |
| 2003/0109973 A1 | 6/2003 | Hensey et al. | |
| 2004/0039499 A1 | 2/2004 | Felke et al. | |
| 2004/0236586 A1 | 11/2004 | Hirshkind | |
| 2007/0124223 A1* | 5/2007 | Avery et al. | 705/29 |

FOREIGN PATENT DOCUMENTS

WO 2007059320 5/2007

OTHER PUBLICATIONS

International Search Report mailed on Sep. 21, 2007, in connection with International Application PCT/US2006/044748 (3 pages).
International Preliminary Report on Patentability mailed on May 20, 2008, in connection with International Application PCT/US2006/044748 (6 pages).
Written Opinion of the International Search Authority mailed on Sep. 21, 2007, in connection with International Application PCT/US2006/044748 (5 pages).
Notice of Allowance issued by the United States Patent and Trademark Office in connection with U.S. Appl. No. 11/281,280 on Jun. 19, 2009 (6 pages).
Office Action issued by the United States Patent and Trademark Office in connection with U.S. Appl. No. 11/281,280 on Nov. 24, 2008 (6 pages).
GE-Aviation Engine exchange.html Y:/Public Domain Prior Art/General Electric/GE-Aviation Engine Exchange.htm (Copy not provided, available as part of USPTO records in connection with U.S. Appl. No. 11/281,280).

(Continued)

*Primary Examiner* — Shay S Glass
(74) *Attorney, Agent, or Firm* — Hanley, Flight & Zimmerman, LLC

(57) ABSTRACT

A material management system includes integrated modules that cooperate to electronically manage a pooled inventory of material held at differing locations and used in the maintenance of multiple fleets of aircraft. The system includes a material request module for processing requests for material and for determining whether the requested material is present at one of the locations. A material transfer module responds to material requests by transferring parts between the differing locations. A material receiving and inspection module controls receiving and inspection of the material. A material shipment module manages the shipment of the material from a supplier in response to a material request.

11 Claims, 22 Drawing Sheets

(56) References Cited

OTHER PUBLICATIONS

GE-Aviation OnPoint.htm Y:/Public Domain Prior Art/General Electric/GE-Aviation OnPoint.com (Copy not provided, available as part of USPTO records in connection with U.S. Appl. No. 11/281,280).
GE Aviation Overhaul.htm Y:/Public Domain Prior Art/General Electric/GE-Aviation Overhaul.htm (Copy not provided, available as part of USPTO records in connection with U.S. Appl. No. 11/281,280).
GE-Aviation on Wing Support.htm Y:/Public Domain Prior Art/General Electric/GE-Aviation On Wing Support (Copy not provided, available as part of USPTO records in connection with U.S. Appl. No. 11/281,280).
GE-Aviation Accessories.htm Y./Public Domain Prior Art/General Electric/GE-Aviation Accessories.htm (Copy not provided, available as part of USPTO records in connection with U.S. Appl. No. 11/281,280).
P&W-Services-Commercial-Engine Maintenance-Engine Monitoring Program.htm Y:/Public Domain Prior Art/Prati&Whitney/Pratt & Whitney-Services-Commercial-Engine Maintenance-Engine Monitoring Programs.htm (Copy not provided, available as part of USPTO records in connection with U.S. Appl. No. 11/281,280).
P&W-Services-Commercial-Engine Maintenance.htm Y:/Public Domain Prior Art/Prati&Whitney/Pratt & Whitney-Services-Commercial-Engine Maintenance.htm (Copy not provided, available as part of USPTO records in connection with U.S. Appl. No. 11/281,280).
P&W-Services-Military-Engine Maintenance.htm Y:/Public Domain Prior Art/Prati&Whitney/Pratt & Whitney-Services-Military.Engine Maintenance.htm (Copy not provided, available as part of USPTO records in connection with U.S. Appl. No. 11/281,280).
P&W-Services-Commercial-Engine Maintenance-Engine Overhaul and Repair Services.htm Y:/Public Domain Prior Art/Prati&Whitney/Pratt & Whitney-Services-Commercial-Engine Maintenance-Engine Overhaul and Repair Services.htm (Copy not provided, available as part of USPTO records in connection with U.S. Appl. No. 11/281,280).
Pratt & Whitney-Services-Military-Engine Maintenance-Engine Overhaul.htm Y:/Public Domain Prior Art/Prati&Whitney/Pratt & Whitney-Services-Military-Engine Maintenance-Engine Overhaul. htm (Copy not provided, available as part of USPTO records in connection with U.S. Appl. No. 11/281,280).
P& W-Services-Commercial-Customer Support.htm Y:/Public Domain Prior Art/Prati&Whitney/Pratt & Whitney-Services-Commercial-Customer Support.htm (Copy not provided, available as part of USPTO records in connection with U.S. Appl. No. 11/281,280).
P& W-Services-Commercial-Engine Maintenance-Fleet Management Programs.htm Y:/Public Domain Prior Art/Prati&Whitney/ Pratt & Whitney-Services-Commercial-Engine Maintenance-Fleet Management Programs.htm (Copy not provided, available as part of USPTO records in connection with U.S. Appl. No. 11/281,280).
Pratt & Whitney-Services-Military-Engine Maintenance-Maintenance Services.htm Y:/Public Domain Prior Art/Prati&Whitney/Pratt & Whitney-Services-Military-Engine Maintenance-Maintenance Services.htm (Copy not provided, available as part of USPTO records in connection with U.S. Appl. No. 11/281,280).
mrms.pdf document (Copy not provided, available as part of USPTO records in connection with U.S. Appl. No. 11/281,280).
Rolls-Royce Services inventory management.htm Y./Public Domain Prior Art/Rolls Royce/Rolls-Royce Services inventory management. htm (Copy not provided, available as part of USPTO records in connection with U.S. Appl. No. 11/281,280).
Rolls-Royce Services engine health.htm Y:/Public Domain Prior Art/ Rolls Royce/Rolls-Royce Services engine health.htm (Copy not provided, available as part of USPTO records in connection with U.S. Appl. No. 11/281,280).
Rolls-Royce Services off wing.htm Y:/Public Domain Prior Art/Rolls Royce/Rolls-Royce Services off wing.htm (Copy not provided, available as part of USPTO records in connection with U.S. Appl. No. 11/281,280).
Rolls-Royce Services in service.htm Y:/Public Domain Prior Art/ Rolls Royce/Rolls-Royce Services in service.htm (Copy not provided, available as part of USPTO records in connection with U.S. Appl. No. 11/281,280).
Rolls-Royce Services.htm Y:/Public Domain Prior Art/Rolls Royce/ Rolls-Royce Services.htm (Copy not provided, available as part of USPTO records in connection with U.S. Appl. No. 11/281,280).
Rolls Boeing visits 6-03.ppt (Copy not provided, available as part of USPTO records in connection with U.S. Appl. No. 11/281,280).
Aircraft & Commerce magazine, Maintenance Engineering section, various issues, NIMROD Publishing. (Copy not provided, available as part of USPTO records in connection with U.S. Appl. No. 11/281,280).
"The Evolving Aircraft Engine Landscape-How GE Aircraft Engines is Raising the Competitive Bar", by Christopher H. Mecray of BTAlex.Brown. (Copy not provided, available as part of USPTO records in connection with U.S. Appl. No. 11/281,280).

\* cited by examiner

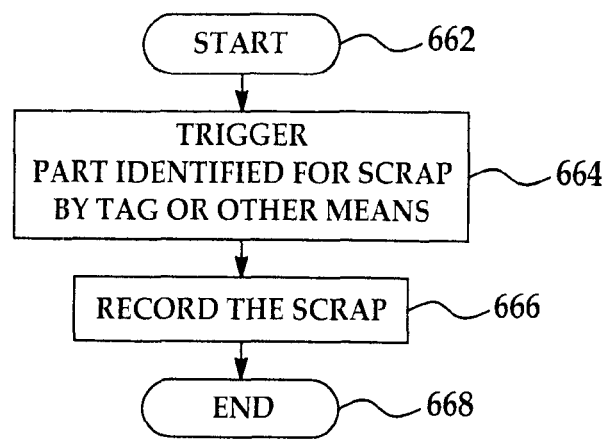
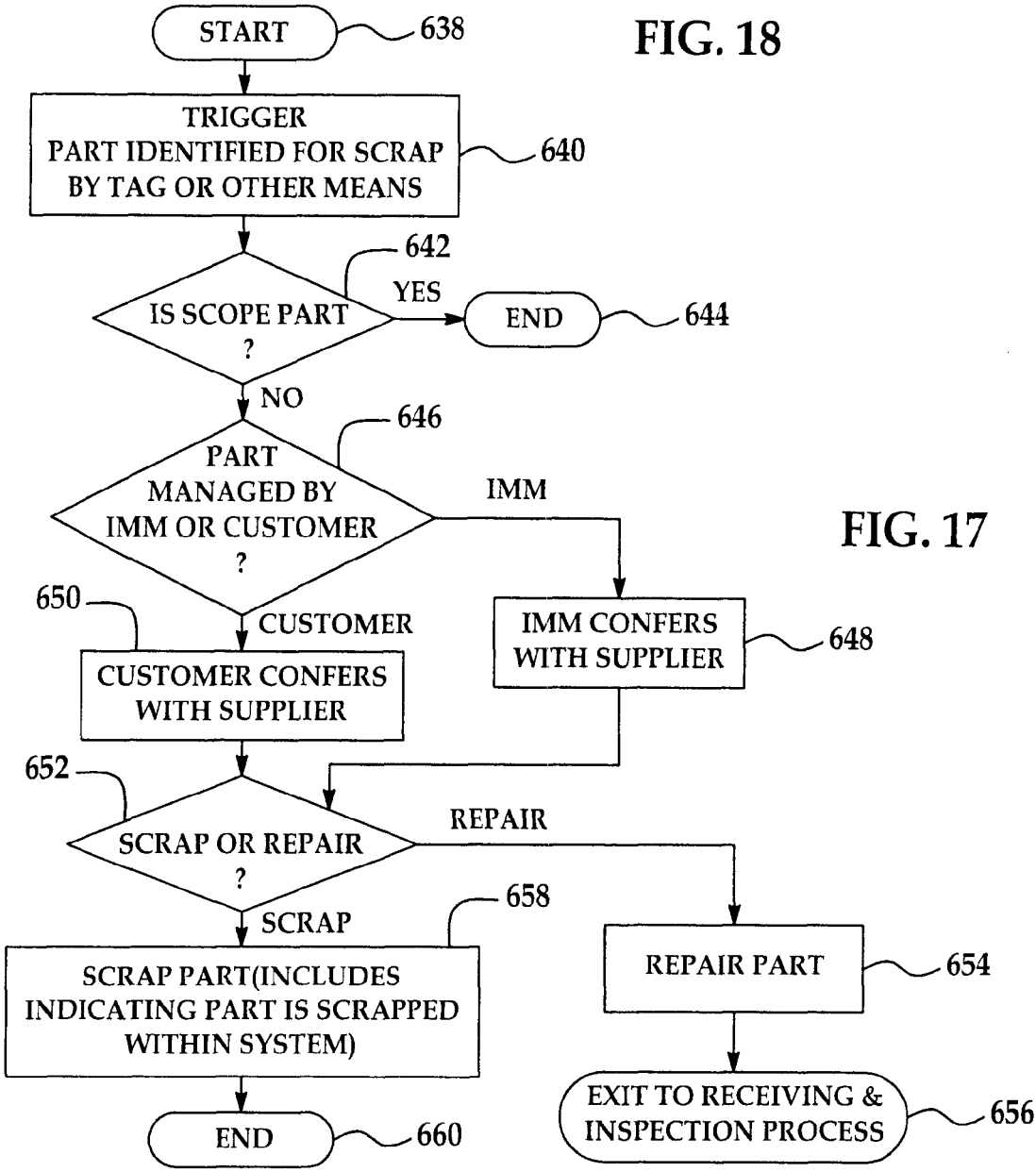
FIG. 18
FIG. 17

MATERIALS MANAGEMENT SYSTEM

CROSS REFERENCE TO RELATED APPLICATIONS

This application is related to U.S. patent application Ser. No. 11/281,280 filed Nov. 16, 2005, the entire contents of which is incorporated by reference herein.

TECHNICAL FIELD

This invention generally relates to the management of materials used by multiple fleets of vehicles, especially parts for aircraft, and deals more particularly with a system for fulfilling requests for maintenance parts in an integrated materials supply chain.

BACKGROUND

Maintenance of commercial aircraft fleets requires the coordination of multiple service and information providers, as well as part suppliers. Line and base maintenance operations required to support aircraft flight readiness require up-to-date service manuals, maintenance repair records, engineering drawings, trained personnel, specialized tools, facilities, parts and an array of other resources. The logistics required for deploying, warehousing and maintaining inventories of repair parts at multiple service locations is also complicated, since parts must be procured from multiple suppliers as well the OEM aircraft manufacturers. Supply chain management and coordination of service providers is made more challenging where fleet aircraft serve wide geographic areas, making centralized service and inventory control by the airline operators impractical.

An integrated materials management system ("IMMS") serving multiple fleets of aircraft, has been proposed, as described in the U.S. patent Applications cross referenced hereinabove. Under the IMMS, the supply of materials for multiple fleets of aircraft is aggregated under the management of single supply chain integrator or manager, thus reducing or eliminating the need for each airline operator to maintain the personnel and infrastructure normally required to manage material suppliers, parts inventories and related logistics. Maintenance providers, including maintenance, repair and overhaul organizations, ("MRO's) are able to draw from a single large pool of parts to support aircraft maintenance requirements. The task of managing a pooled inventory of parts is complicated by the fact that multiple suppliers must be integrated into the supply chain to support maintenance requirements for multiple fleets of geographically separated aircraft.

Accordingly, there is a need for a materials management system that efficiently processes and fulfills requests for maintenance parts. The disclosed embodiments are intended to satisfy this need.

SUMMARY

Embodiments of the disclosure provide a materials management system ("MMS") comprising integrated modules that electronically manage parts and materials used in the maintenance of multiple fleets of aircraft. The MMS manages sourcing, tracking and disposition of both expendable and rotable/repairable parts required for aircraft maintenance. The MMS may be used in combination with the IMMS in which materials required from maintenance of multiple fleets of aircraft are aggregated under the control of a supply chain integrator and used by maintenance providers such as MROs. The use of MMS in combination with IMMS may reduce carrying costs related to parts inventory. Integrated electronic management of maintenance parts and materials also may reduce the need for planning and purchasing personnel, providing additional cost saving benefits. In addition to improved operating efficiencies, electronic management of parts and material inventories may result in improved maintenance history records.

According to one disclosed method embodiment, managing a pooled inventory of parts held at different locations and used in the maintenance of multiple fleets of aircraft comprises: generating a request for a part required for the maintenance of an aircraft; determining whether the requested part is in the pooled inventory; if the requested part is determined to be in the pooled inventory, then generating a logistical plan for moving the part to a location where the maintenance is to be performed on the aircraft when the requested part is determined to be in the pooled inventory; and, if the requested part is determined not to be in the pooled inventory, then ordering a supplier to ship the requested part to a location where the maintenance is to be performed on the aircraft. When the requested part is determined to be in the pooled inventory at the location where the maintenance is to be performed, the part is reserved and an aircraft tail number or other unique identifier assigned to the part. If it is determined that the requested part is not in the pooled inventory, then an order is issued to a part supplier to send the requested part to the location where the maintenance is to be performed. The method may further comprise: removing a part on the aircraft; replacing the removed part with the requested part; and determining whether the removed part is expendable or repairable. If the removed part is determined to be expendable, then it is determined whether the removed part satisfies a set of warranty conditions requiring a supplier to replace the removed part. If the removed part is determined to be repairable, then a determination is made of whether the removed part should be repaired or exchanged for a replacement part.

According to another method embodiment, managing parts used in the maintenance of multiple fleets of aircraft comprises: generating a request for a replacement part required for the maintenance of an aircraft in one of the fleets; moving the requested replacement part to a location where the maintenance on the aircraft is to be performed; removing and replacing a part on the aircraft with replacement part; moving the removed part to a parts receiving and inspection location; receiving and inspecting the removed part at the receiving inspection location; and, determining at the receiving and inspection location whether the removed part is serviceable. If the removed part is determined not to be serviceable, then the removed part is placed in quarantine. If the removed part is determined to be serviceable, then it may be returned to the pooled inventory.

According to another method embodiment, managing parts used in the maintenance of a fleet of aircraft comprises: receiving a part requested for the maintenance of an aircraft; inspecting the received part to determine whether the part meets a set of predefined conditions; determining whether the part is a repaired part; if the part is determined to be a repaired part, then determining whether a set of historical records relating to the repaired part are complete; and, if either the historical records are determined not to be complete or the predefined conditions are determined not to have been met, then placing the repaired part in quarantine. The predefined conditions may include whether the part is serviceable and undamaged. The historical records may include service bulletins and airworthiness directives relating to the part. The method may further include determining whether a request is open for the part, and if a request is not open, then placing the part in inventory.

According to a further embodiment, a system is provided for managing a pooled inventory of parts held at differing locations and used in the maintenance of multiple fleets of aircraft. The system comprises: a material request module for processing requests for material and for determining whether the requested material is present at one of the locations; a material transfer module responsive to material requests for transferring parts between the different locations; a material receiving and inspection module for receiving and inspecting the material; and, a material shipment module for managing the shipment of material from a supplier in response to the material request. The system may further include a material quarantine module for quarantining material received and inspected by the material receiving and inspection module. A material scrap module manages scrap material received and inspected by the material receiving and inspection module. A material inventory adjustment module is provided for making adjustments to records reflecting the pooled inventory. A materials provisioning module determines the material required for maintenance of aircraft at each of the locations.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 17 is a functional block diagram illustrating the scrap process for rotable parts.

FIG. 18 is a functional block diagram illustrating the scrap process for expendable parts.

DETAILED DESCRIPTION

Figure 1:
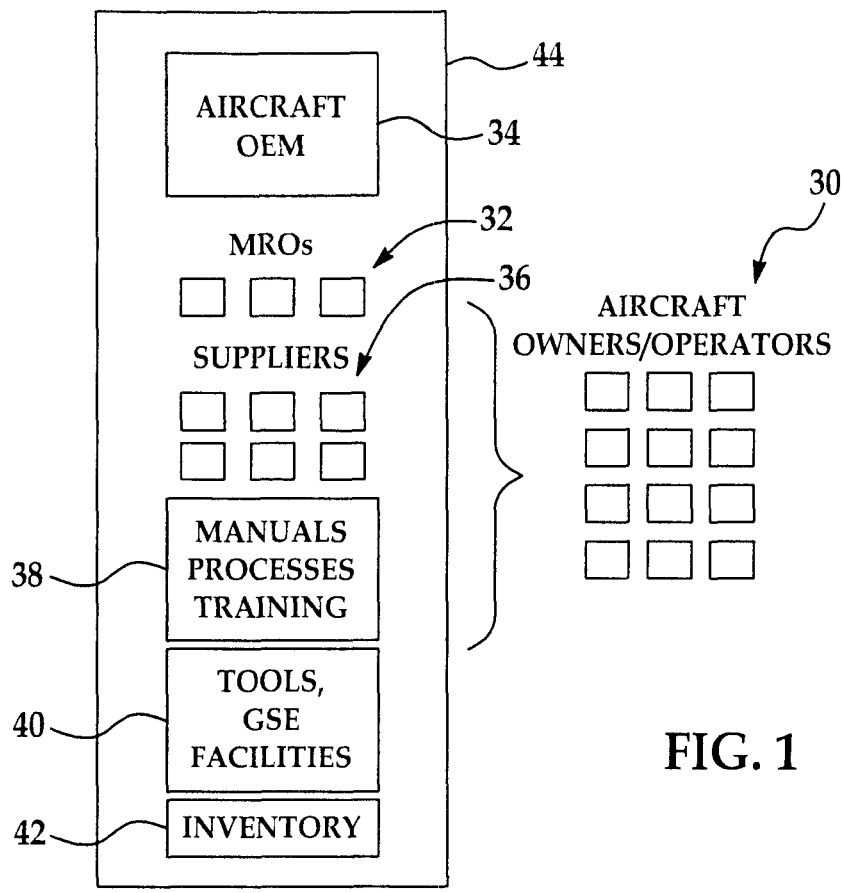
FIG. 1 is a block diagram illustrating the organization of an IMMS (integrated maintenance and materials management system).

Referring first to FIG. 1, maintenance service and material providers for multiple fleets of aircraft 30 are aligned in a centrally managed IMMS 44. The IMMS 44 is managed by a single management service provider ("MSP"), sometimes also referred to herein as an integrator, which may be, for example, the aircraft OEM 34. The MSP has responsibility for managing the MROs 32 and suppliers 36, as well as managing the necessary manuals and training 38, tooling, GSE and facilities 40 and parts inventory 42. The MSP may provide the IMMS to each of the airline operators 30, essentially as a turn-key service, relieving the airline operators 30 of the need for managing MROs, parts inventory, etc. Optionally, the MSP may provide the airline operators 30 with only centrally managed maintenance, or centrally managed, integrated materials management.

Figure 2:
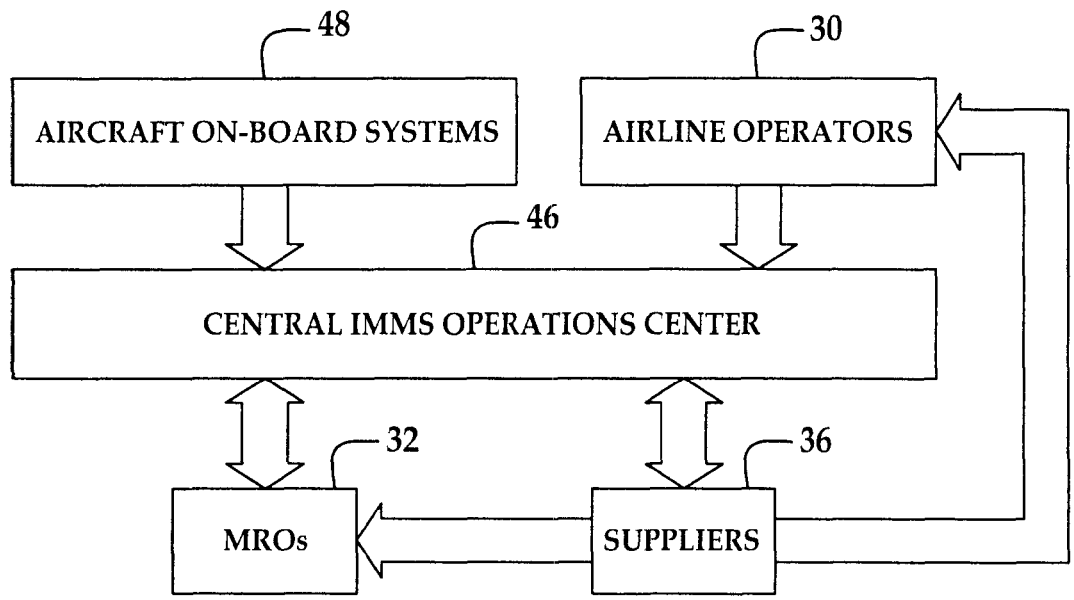
FIG. 2 is a block diagram illustrating the primary functional elements of the system shown in FIG. 1.

FIG. 2 shows the overall functional relationship between the MROs 32, parts suppliers 36, customers 30 (airline operators) and central management of maintenance functions provided by the MSP. The MSP may control a central IMMS operations center 46. The operations center 46 receives various kinds of data from aircraft onboard systems 48, and converts this data into centrally stored information which is used in the management of the IMMS. This onboard systems data may include for example, flight log records, data from a flight record recorder, aircraft health management and aircraft configuration information. Information is exchanged between the operations center 46 and the airline customers 30. For example, information is obtained from the airline operators 30 relating to performance of the aircraft, departure and arrival information, reliability data, etc. The information from the on-board systems 48 and the airline operators 30 is used for a variety of purposes at the operation center 46, including scheduling and ordering of parts, scheduling and ordering of maintenance operations and determining aircraft utilization that is converted into the price charged to the airline operators 30 for the services rendered by the MSP.

Information exchanged between the MROs 32 and the operation center 46 may facilitate scheduling and coordination of base and/or line maintenance for the customer's aircraft. Finally, information is exchanged between the operation center 46 and the part suppliers 36 who are managed directly under the IMMS system by the MSP.

Figure 3:
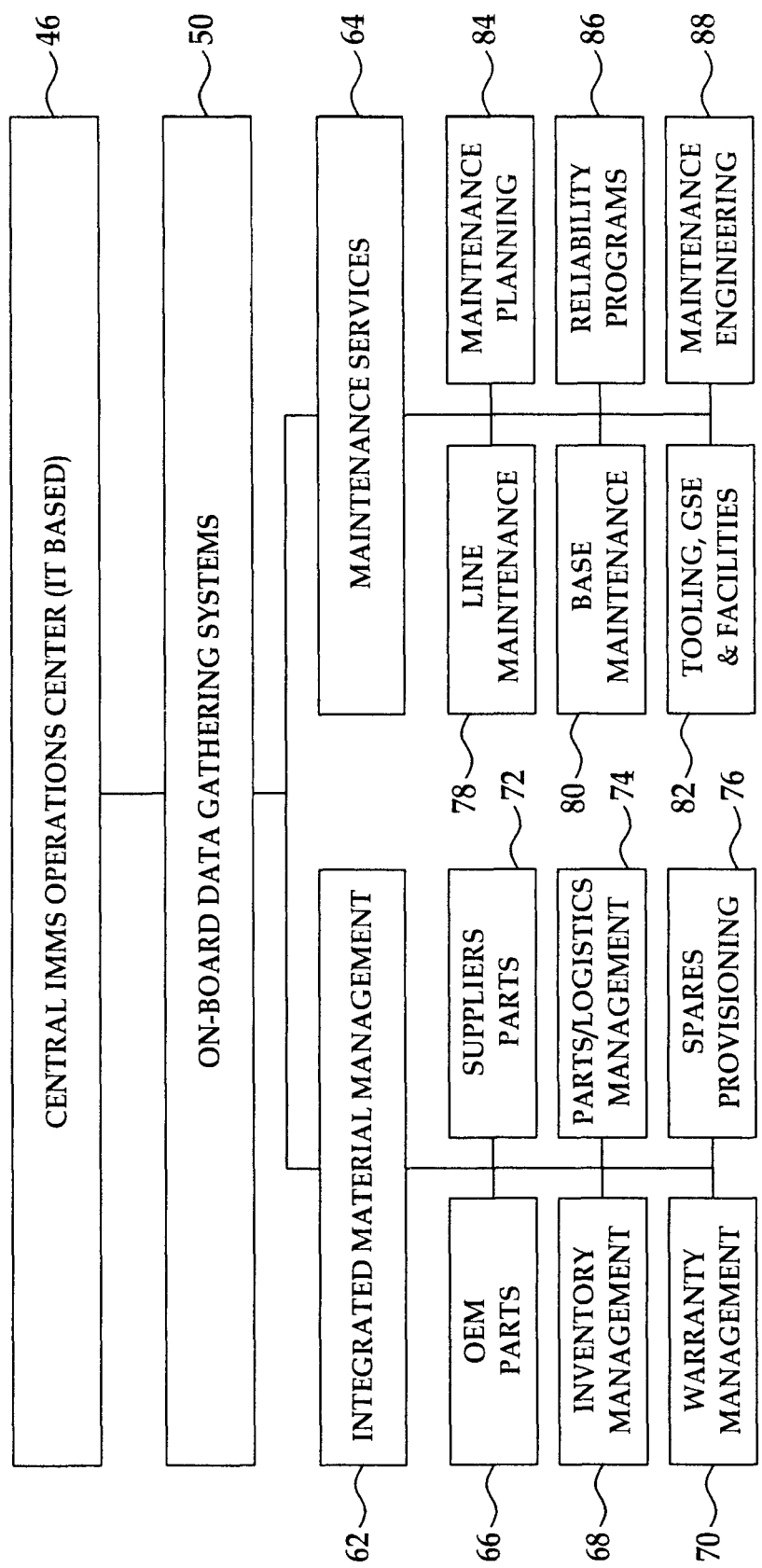
FIG. 3 is a block diagram illustrating the functional elements of the integrated materials management and the maintenance services in relation to a central operations center.

Referring now to FIG. 3, integrated material management 62 and maintenance services 64 are controlled and managed by the central operations center 46 using information about the aircraft obtained from on-board data gathering systems 50. The central operations center 46 may provide an airline operator customer with either maintenance services 64 or integrated material management (IMM) 62, or both. As used herein, integrated maintenance and material services or IMMS means a service program provided to a customer that combines and integrates both maintenance services 64 and the IMM 62.

As will be discussed later in more detail, IMM 62 includes management by the MSP of OEM parts 66, supplier parts 72, parts inventory management 68, management of parts/logistics 74, warranty management 70 and spare part provisioning 76. The maintenance services 64 may include line maintenance 78, base maintenance 80, management of tooling, ground support equipment and facilities 82, maintenance planning 84, management of reliability programs 86, and maintenance engineering 88.

In the case where the MSP provides the airline operator customer 30 with only IMM as a standard service, the MSP assumes responsibility for procuring the parts, which the MSP then deploys to the airline operator 30 or to the MROs 32. The aircraft OEM 34 may retain ownership (legal title) of the parts, but the customer 30 takes responsibility for warehousing the parts inventory. As will be later discussed, a server is maintained on-site at the parts warehouse which is networked with the operations center 46.

When the customer (owner/operator) 30 removes a part from the warehouse for use in servicing an aircraft, the removal of the part from inventory is electronically communicated through the on-site warehouse server to the operation center 46, thus allowing the MSP to maintain real time records of the part inventory at the customer's warehouse. This real time information may then be used by the MSP to allow timely reordering of replacement parts, and just-in-time delivery to the customer's warehouse in order to maintain part inventories at optimum levels. When the operation center 46 receives notice that the customer has removed a part from the warehouse inventory, ownership immediately passes to the customer 30 and the customer is invoiced for the part. This business model allows the MSP to accumulate historical information concerning the type and number of parts used by the customer 30 at multiple warehouse locations, which aids the MSP in efficiently managing part inventory levels and the logistics of part delivery. Moreover, this accumulated information concerning the parts used by the customer aids the MSP in providing data to pricing model used to charge the customer for the services provided by the MSP.

The IMM program described above allows the aircraft OEM 34 to purchase parts based on the customer's forecasted consumption. As a result, it is generally necessary to carry lower levels of inventory, and fewer parts are required to be written off to obsolescence. Moreover, the IMM parts management program, described later in more detail, facilitates balancing and pooling of part inventories at differing customer warehouse locations.

Figure 4:
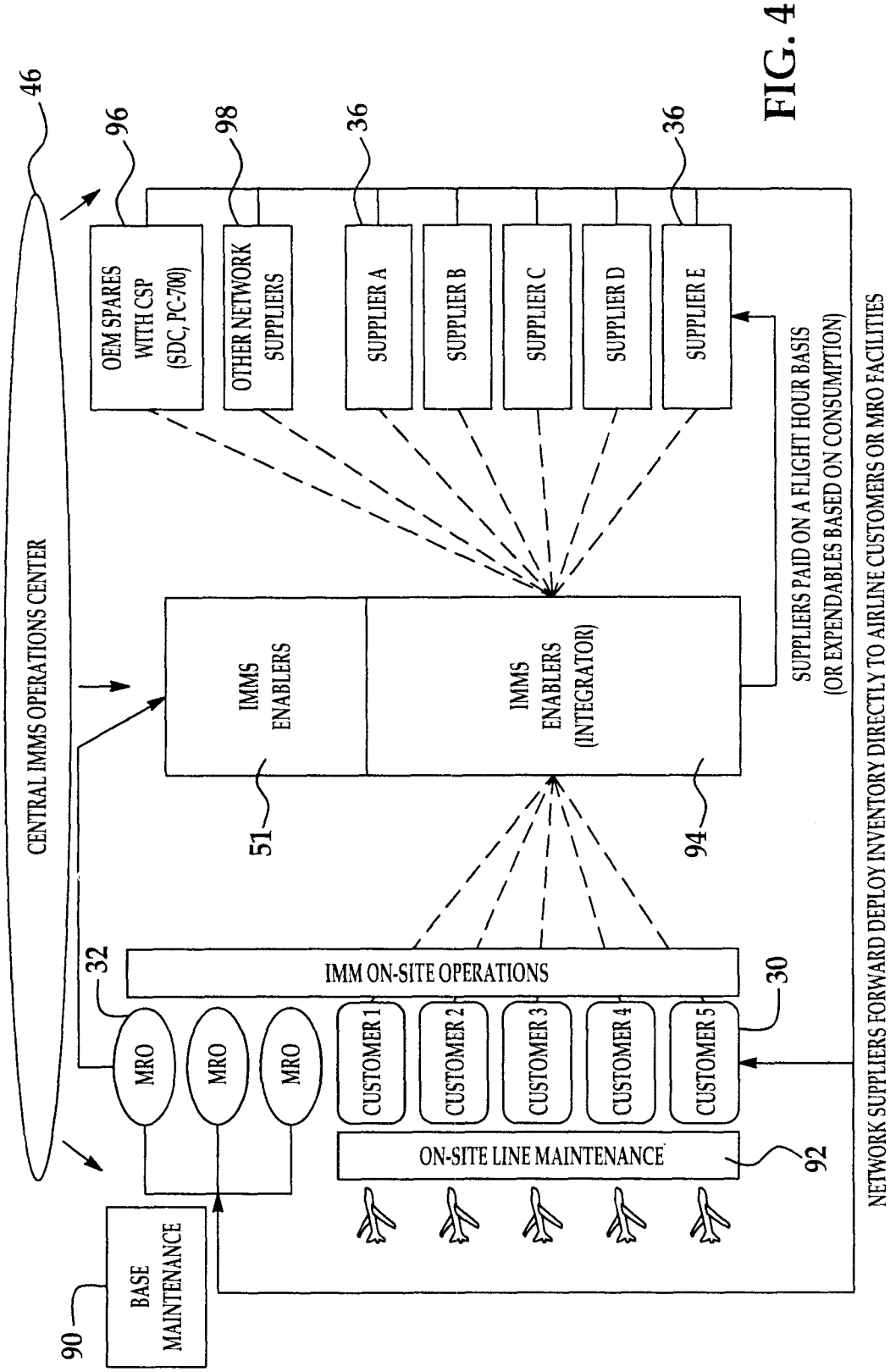
FIG. 4 is a block diagram showing the organizational relationship between the aircraft owners/operator, MROs, parts suppliers and the central operations center.

Attention is now also directed to FIG. 4 which shows in greater detail how IMMS provided to customers is managed by the MSP using a central operations center 46. The MSP contracts with and manages MROs 32 who provides on-site line maintenance 92, generally at locations where the customers 30 fly. The MROs 32 also provide the customers 30 with base maintenance 90, coordinated by the central operations center 46. In instances where unplanned maintenance is required, based on on-board systems 50, the operations center 46 uses IMMS enablers 51 to act as a global integrator 94 of the parts, engineering, services and maintenance tasks to perform the necessary work to remedy the fault. In IMMS, however, the operation center 46 manages the entire materials supply chain, ordering parts directly from the OEM 96, network suppliers 98 and various other suppliers 36, and arrange for their delivery to the MROs 32.

The operations center 46 may manage deployment of the parts either directly to the customers 30 (where maintenance service is not provided by the MSP), or to the MROs 32 (where IMMS is provided). In either event, the MSP may provide up to 100% of the customers part requirements which are managed by the MSP until the exchanged part is installed on the aircraft. As can be appreciated from FIG. 4, the operations center 46 managed by the MSP acts as a single point of management and invoicing for the entire materials supply chain.

Figure 5:
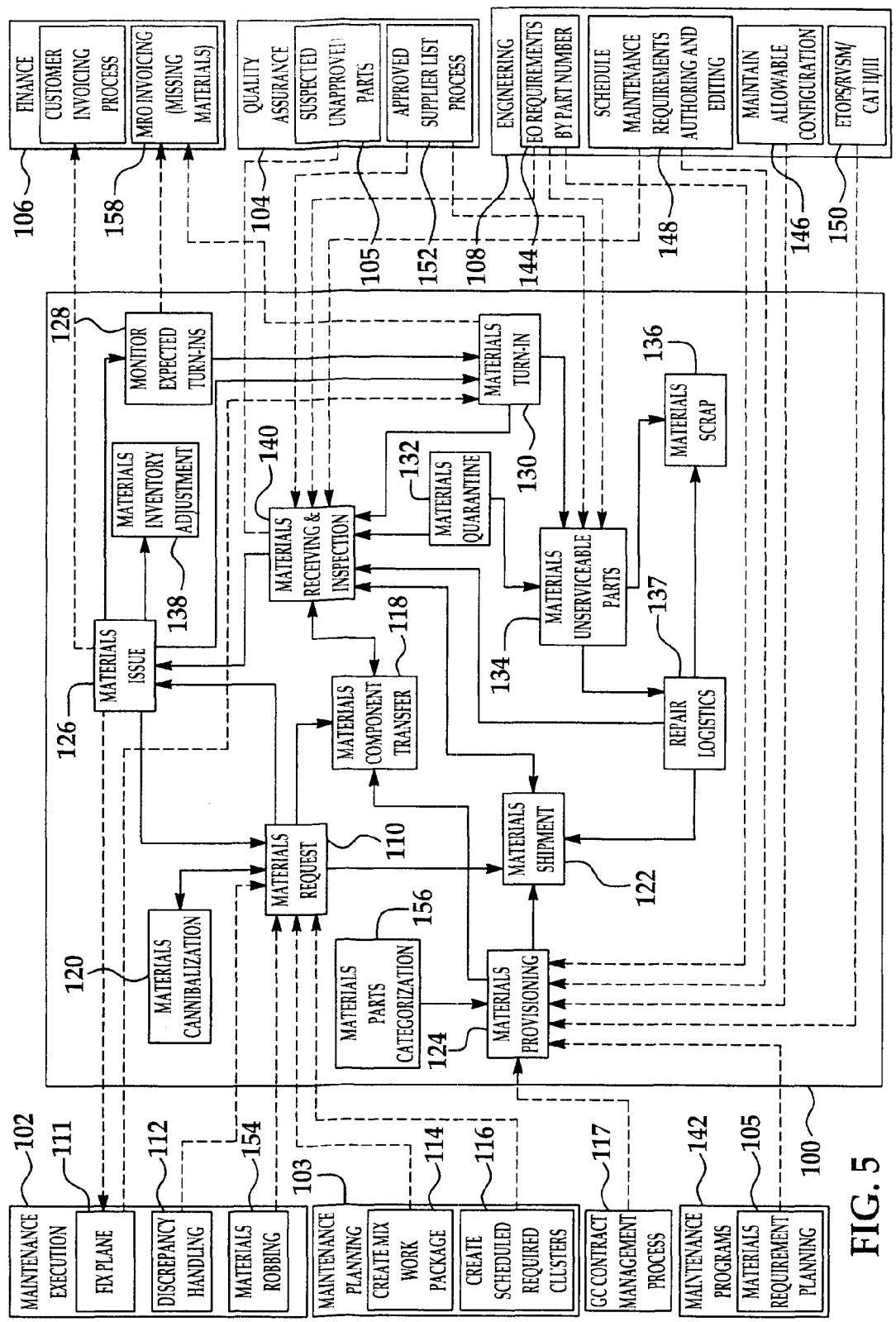
FIG. 5 is an overall block diagram illustrating the MMS.

Referring now to FIG. 5, the MSP may employ a materials management system 100 (MMS) for electronically managing parts and materials used in the maintenance of aircraft in multiple fleets. The MMS 100 may be used in combination with IMM or IMMS previously described to manage a wide range of parts and materials used to support maintenance of the aircraft in the fleets. The MMS 100 may be implemented by software that is resident, for example, in one or more computers at the central operations center 46 (FIGS. 3 and 4). A will be described below, the various modules of the MMS 100 may comprise programmed instructions in the form of software. Broadly, the MMS 100 functionally interfaces with the MSP's maintenance execution 102, maintenance planning 103, quality assurance 104, maintenance programs 105, finance 106 and engineering 108. A request for materials required for the maintenance of an aircraft may be initiated as a result of the handling of discrepancies 112, the creation of maintenance work packages 114 or materials requirement planning 142. Materials request are managed by a materials request module 110 which, as will be described below, functions to locate the requested parts or materials and initiates a request that they be transferred to the location where the maintenance is to be performed.

For sake of convenience in this description, the term "parts" is intended to include a wide range of materials, without limitation, that may be used or required in connection with the maintenance of aircraft in the fleet. Parts may include those that may be repairable (repairable parts), parts that are rotable (rotable parts) and parts that are expendable (expendable parts). Parts may be requested as a result of discrepancy handling 112 or robbing of materials 154 which form part of the maintenance function 102. Also, part requests may be generated by the maintenance planning function 103, which include parts forming part of a maintenance work package 114 and scheduled clusters 116 of parts that may be periodically required. In response to a request for parts, the materials request module 110 may issue directives to either a materials component transfer module 118 or a materials shipment module 122. Also, a similar directive may be issued that may result in a materials cannibalization at 120 where the requested parts or materials are cannibalized from aircraft in the fleet. The materials component transfer module 118 provides for the transfer of parts that are managed in the pooled inventory forming part of the IMM or IMMS system. Parts and materials may be transferred within the network as a result of a direct request created by a maintenance work package 114 or scheduled required clusters 116.

The materials shipment module 122 manages the ordering and receipt of parts and materials from outside suppliers where the parts cannot be currently found within the networks pooled inventory of parts.

A materials provisioning module 124 assists in determining what parts and how many parts are needed at a particular location for the maintenance of a particular aircraft.

A materials issuance module 126 is responsible for reserving and issuing parts required to fix an airplane at 111. Parts that are removed from the airplane may be then processed by the material turn-in module 130 for disposition. The materials request module 110 may report material issuances at 126 which are monitored by maintenance 102 and finance 106. Material issuances may result in the need for monitoring expected turn-ins at 128 and actual turn-ins at 130. In some cases, the materials turned in at 130 may be subject to quarantine which is managed by a materials quarantine module 132. If a requested part is not found, then material issuance module 126 advises the materials request module 110 that the part cannot be found.

A materials receiving and inspection module 140 manages the process by which parts are received from any source, including parts removed from service on an aircraft, parts transferred between inventory locations and parts received from outside suppliers. Briefly, module 140 provides for the inspection of the incoming part, including a determination of its condition and quality, and provides for its disposition. Accordingly, the materials receiving and inspection module 140 manages incoming parts resulting from the materials turn-in 130, materials shipped by the materials shipment module 122 and materials transferred by the materials component transfer module 118. Additionally, module 140 may receive parts managed by a materials unserviceable parts module 134, and parts that are suspected by quality assurance at 105 of being unapproved. Issues relating to the received parts are reported by the materials receiving and inspection module 140 to materials issue 126. Depending upon the results of the inspection performed by module 140, parts may be processed by the materials quarantine module 132. In some cases, where parts are deemed unserviceable by the materials unserviceable parts module 134, the materials may be processed by a materials scrap module 136.

A materials inventory adjustment module 138 keeps track of material transfers and adjusts inventory records accordingly. The materials unserviceable parts module 134 may refer to an improved supplier list: process 152 in order to determine whether certain parts originate from suppliers that are on an improved supplier list.

A repair logistics module 137 provides logistics related to unserviceable parts that are returned, parts that are scraped locally or at the supplier and purchase orders for customer furnished parts.

In connection with parts provisioning supplied by the materials provisioning module 124, information may be received including EO requirements by part number at 144, allowable aircraft configurations 146, scheduled maintenance requirements 148 and parts requirements dictated by ETOPS (extended operations qualifications) and RVSM (reduced visual separation minimal requirements). Also, the material provisioning module 124 may receive input from the MSP as part of the process 117 for managing contracts between the MSP and service providers (MRO's or airline operators).

Figure 6:
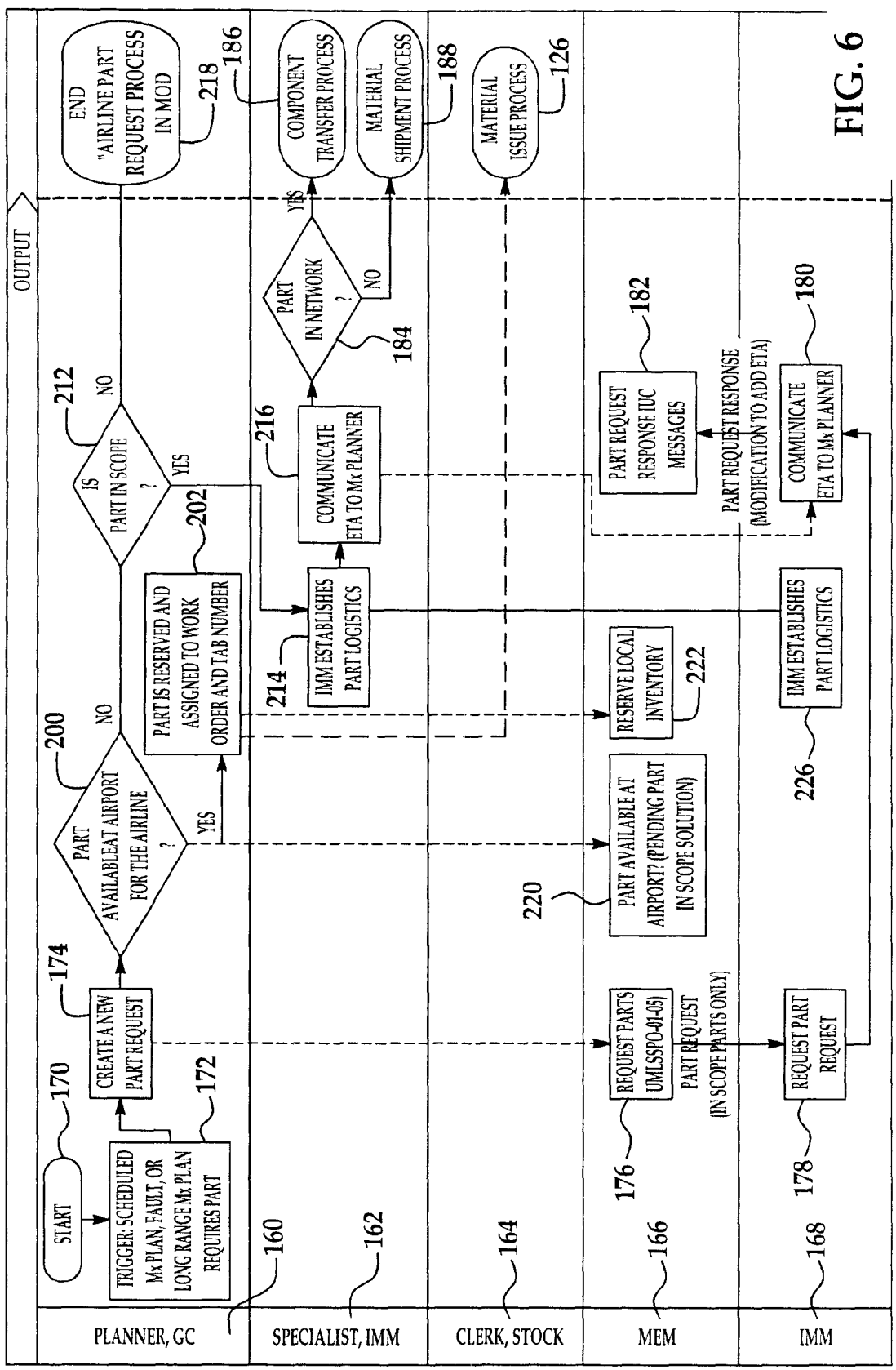
FIG. 6 is a functional block diagram illustrating the materials request module.

Reference is now made to FIG. 6 which illustrates further details of the materials request module 110 and related processes. The processes flow from left to right, with final outputs on the far right side of the block diagram. The person or system responsible for or involved in each step of the process is shown along the far left hand side of the block diagram, and include, from top to bottom, a planner 160 for the network, an IMM specialist 162, a stock clerk 164, a materials engineering maintenance system 166 and the IMM system 168. Starting at 170, a triggering event at 172 is initiated by the planner 160, which may be a scheduled maintenance plan, a fault or a long range maintenance plan that requires parts. A new part request is created at 174 and a determination is made at 200 of whether the requested part is available at the location where the maintenance is to be performed; in the illustrated example, a determination is made of whether the part is available at the airport.

The part request created at 174 is also communicated at 176 to the MEM 166 and to the IMM 168, as shown at step 178. If the part is determined not to be available, then a determination is made at 212 of whether the part falls within the scope of the parts that are managed by the IMM. If the part is not within the scope, then the process ends at 218. However, if the requested part is within the scope of the IMM, then the necessary logistics are established at 214 to acquire the part. As shown at 226, establishing these logistics is the responsibility of the IMM. At step 216, the ETA (estimated time of arrival) of the requested part is communicated to the maintenance planner 160. At 180, the maintenance planner may provide a part request response to maintenance engineering management at 182.

At 184, a determination is made of whether the requested part is present in the IMM pooled inventory. If the part is found to be in inventory, then the process continues to the component transfer module 186. If, however, the requested part is not in inventory, then the process continues to the material shipment module 188. Returning now to step 200, if the requested part is found to be present at the location where maintenance is to be performed, then at step 202, the part is reserved and assigned to a work order and a tail number of the aircraft requiring the part. The MEM 166 makes an appropriate reservation of local inventory at step 222, and further processing of the part is handled by the material issuance module 126.

Figure 7A:
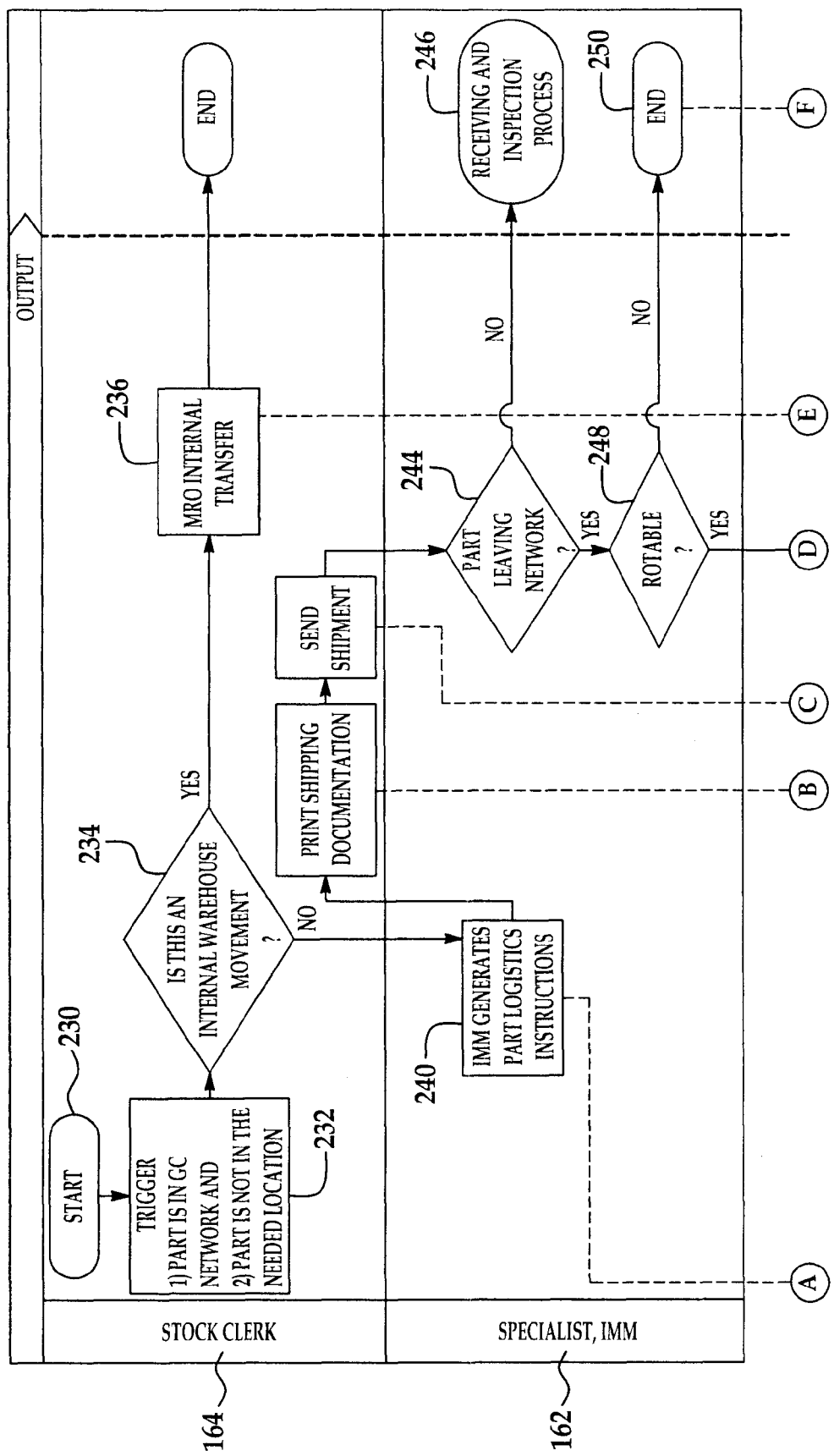
FIGS. 7A and 7B depict a functional block diagram illustrating the material component transfer module.
Figure 7B:
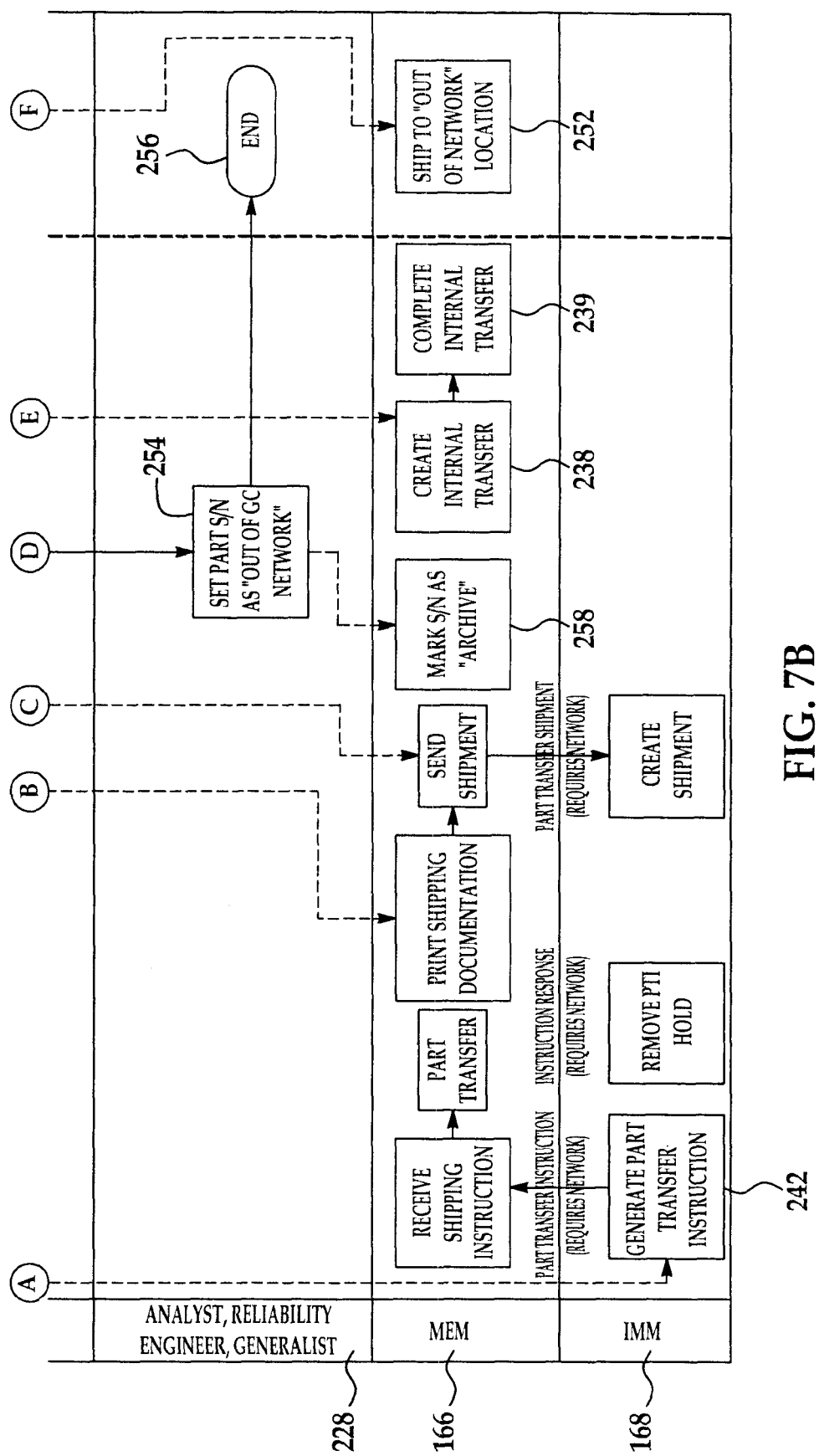

Attention is now directed to FIG. 7 which shows in greater detail the process flow for the material component transfer module 118 (FIG. 5). The parties and systems responsible for processes forming part of the material component transfer module 118 include a stock clerk 164, IMM specialist 162, a generalist (or alternatively, a reliability engineer or analyst) 228, MEM 166 and IMM 168. The process starts at 230 and is triggered at 232 in response to a determination made by the materials request module 110 that a requested part is in the pooled inventory of the IMM, and that the part is not currently needed in its current location. At 234, a determination is made of whether the required part movement is simply an internal warehouse movement where the part is located. If the part requires only internal warehouse movement, then the stock clerk 164 arranges for an internal transfer at 236. In order to effect the transfer, the MEM 166 creates an internal transfer order 238 and then carries out the internal transfer at 239.

Figure 8A:
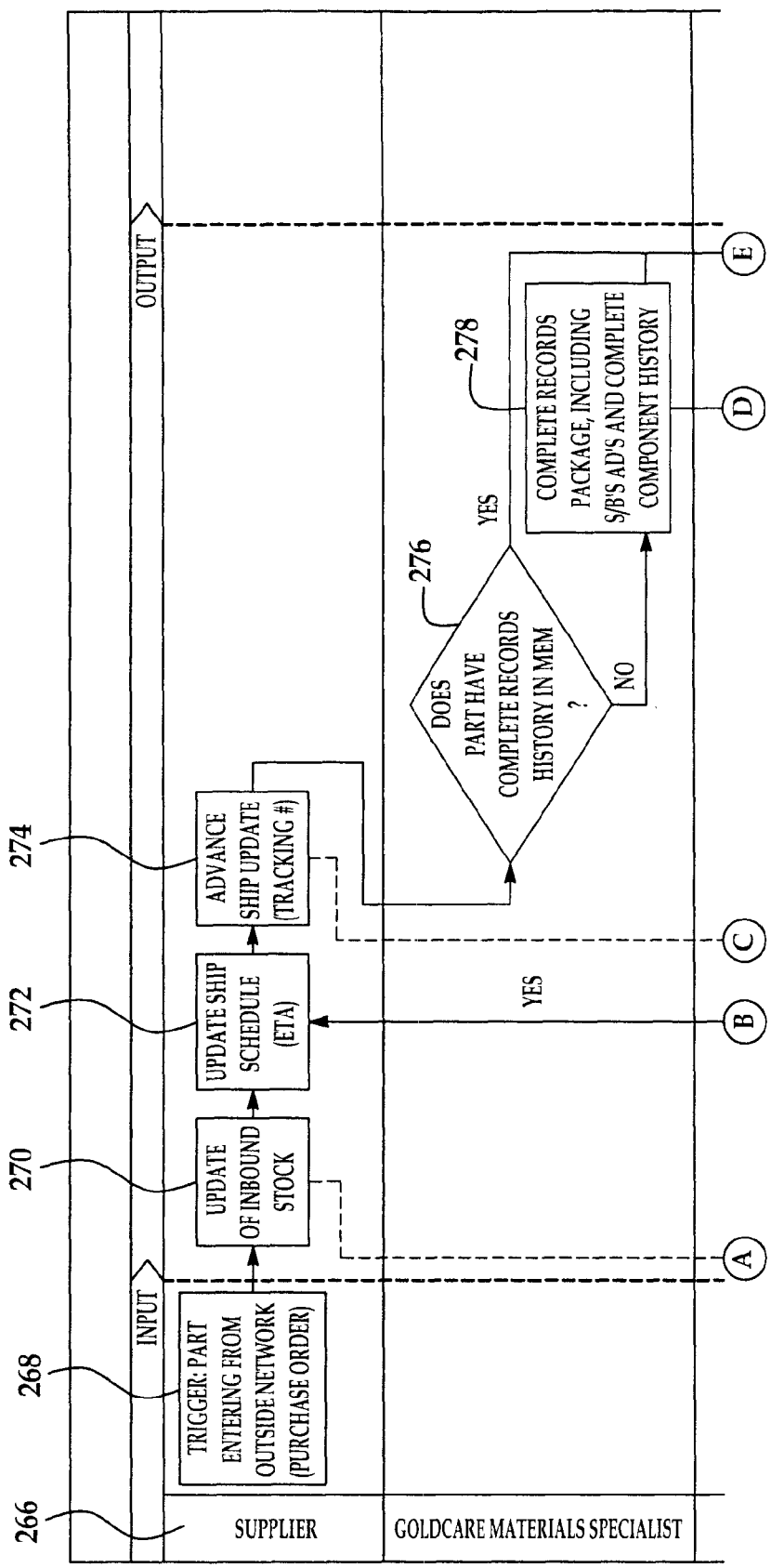
FIGS. 8A and 8B depict a functional block diagram illustrating the material shipment module.
Figure 8B:
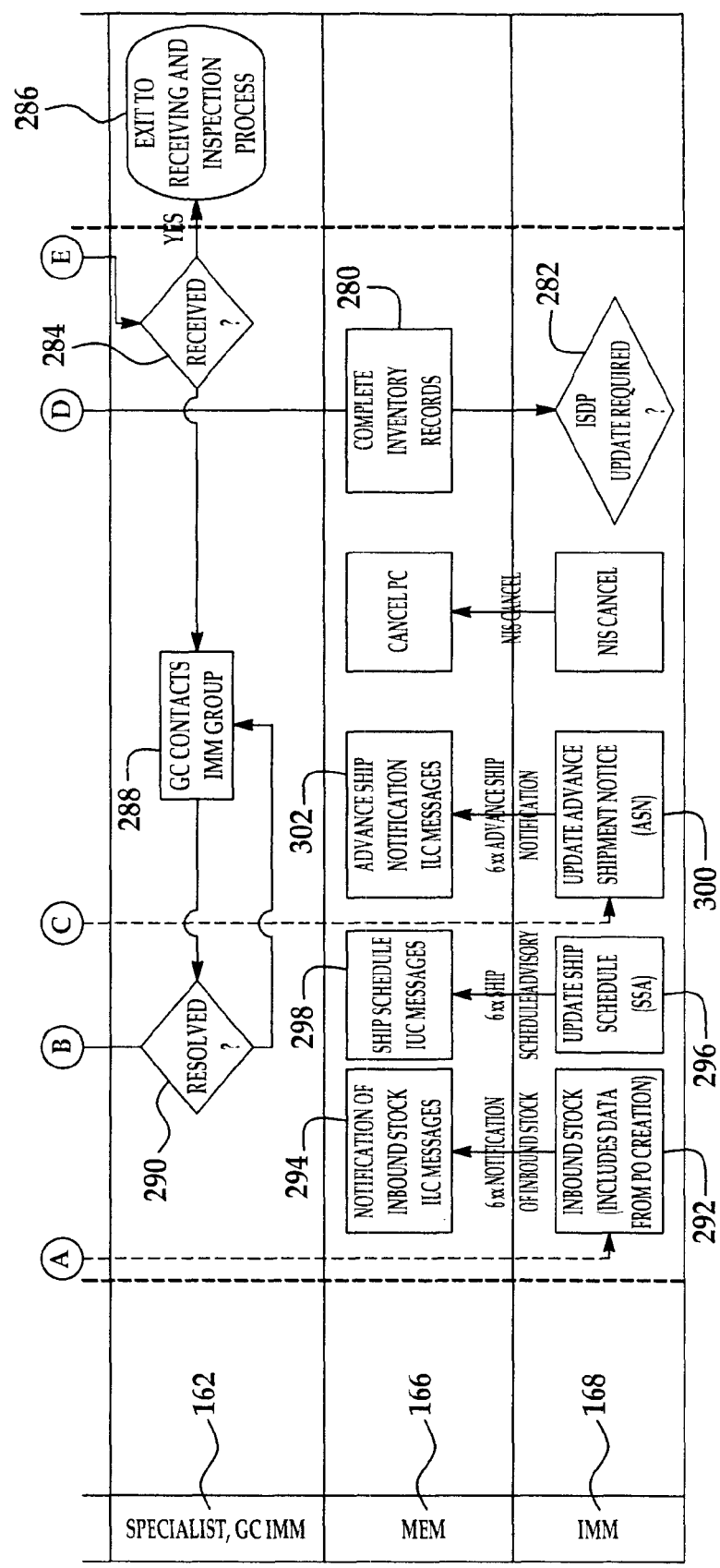

If, however, transfer of the requested part does not involve an internal warehouse movement, then at 240 the IMM specialist 162 generates the appropriate part logistics instructions at 240, using the IMM 168 at 242. Next, at 244, a determination is made of whether the requested part is leaving the integrated IMM network. If the part is not leaving the IMM network, then the process continues at 246, with the receiving and inspection process module 140 carrying out the receiving and inspection processes which will be described below in connection with FIG. 11. If, however, the part is being transferred out of the IMM network, then a determination is made at 248 of whether the part is a rotable part. If the part is a rotable part, then the process ends at 250 and the MEM 166 effects shipment to the "out of network" location at 252. If the part is determined to be a rotable part at 248 then the part's serial number is changed to an "out of the network", following which the process ends at 256. The serial number of the rotable part is then archived by MEM 100 at 258. Details of the material shipment module 122 are shown in FIG. 8. The persons or systems having responsibility for material shipment process include an IMM specialist 162, MEM 166, IMM 168 and a parts supplier 266. The material shipment process is triggered to begin at 268 by the receipt of a request for materials. At 270, inbound stock from the supplier is updated by the IMM 168 at 292 and notification is generated by MEN at 294. Next, at 272, the shipping schedule (ETA) is updated by the IMM 168 at 296 and by the MEM at 298. At 274, 300, advanced shipping processes (assignment of tracking numbers) is updated and a determination is then made at 276 of whether MEM 166 has a complete records history for the part. If the part does not have a complete records history, then the records package is updated at 278. This updating process may include recent S/B's (service bulletins), AD's (airworthiness directives) and complete component history. The complete inventory records of the MEM 166 are updated at 280 and the IMM 168 updates the ISDP (in-service data program), as required, at 282.

When the records package has been completed at 278, a determination is made at 284 of whether the part has been received. If the part has been received, then the process continues at 286 to the receiving and inspection module 140. If it is determined at 284 that the part has not yet been received, then the IMM 168 is contacted at 288 in order to resolve the delay at 290. When the part delay is resolved at 290, the shipping schedule is updated at 272.

Figure 9A:
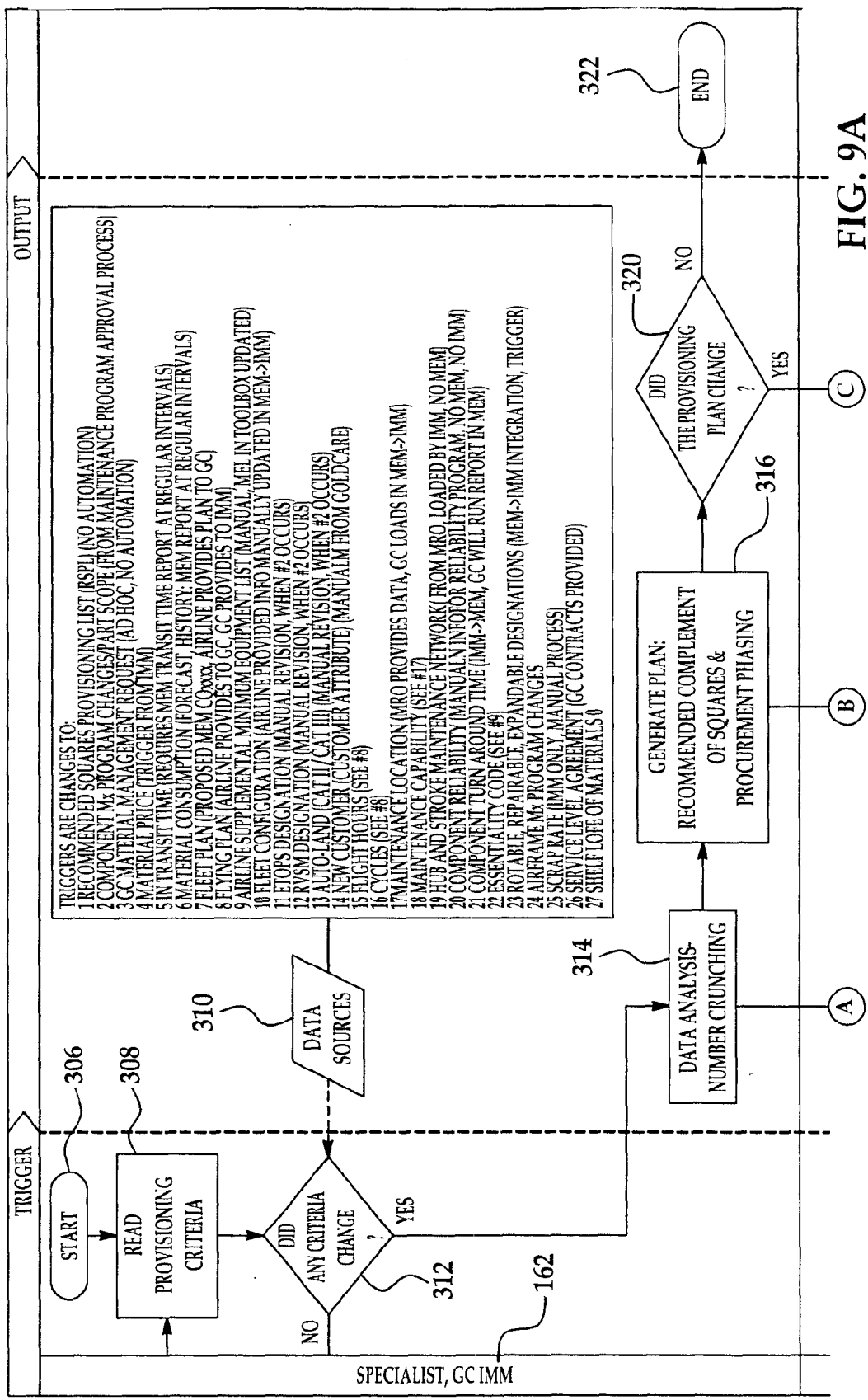
FIGS. 9A and 9B depict a functional block diagram illustrating the material provisioning module.
Figure 9B:
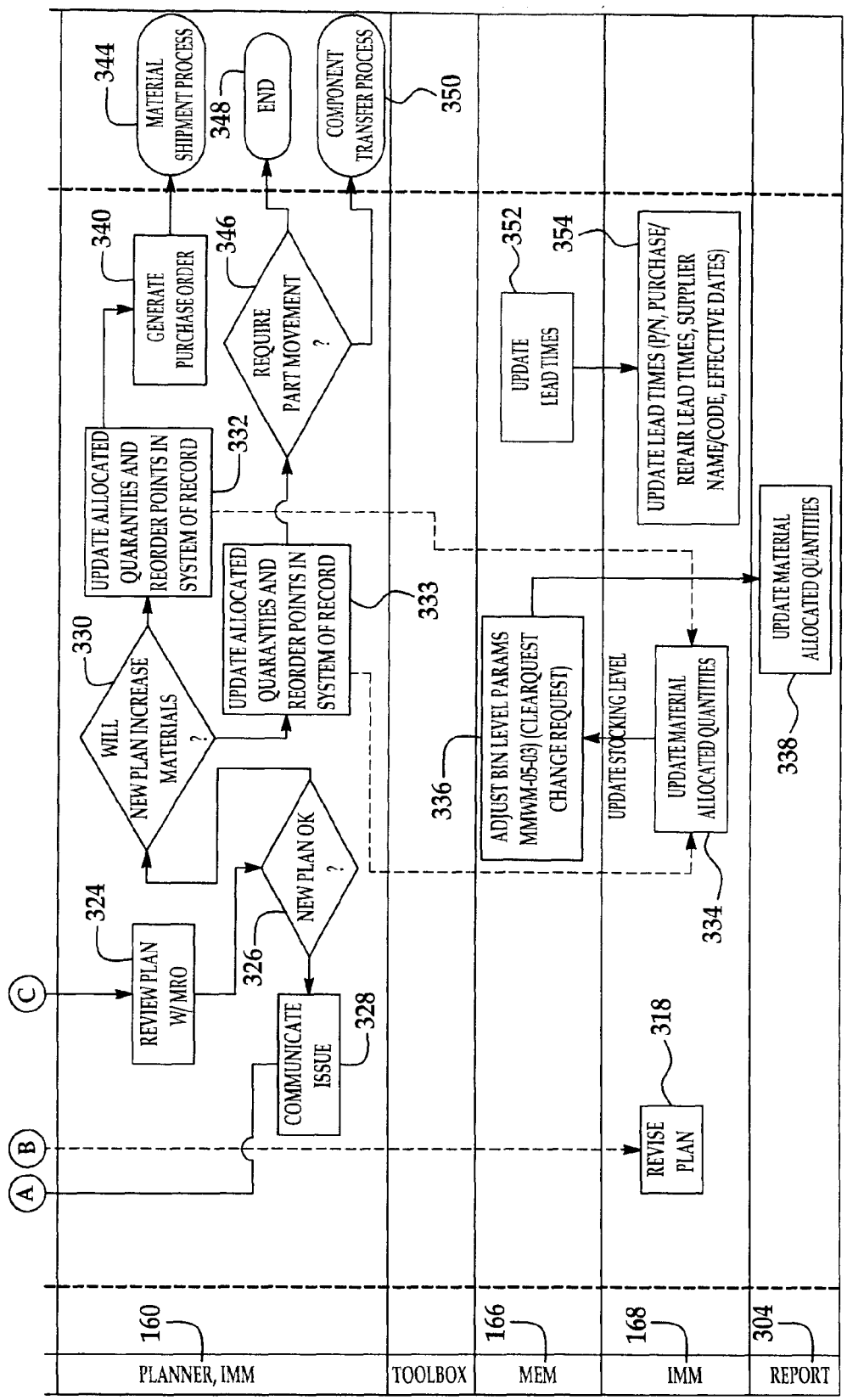

Details of the material provisioning module 124 are shown in FIG. 9. Parties and systems responsible for material provisioning processes include an IMM planner 160, IMM specialist 162, MEM 166, IMM 168 and a reporting function 304. Starting at 306, the IMM specialist 162 reads provisioning criteria for aircraft and may consult several data sources 310 in connection with the criteria. At 312, the specialist 162 determines whether any provisioning criteria have changed. If criteria have changed, then the specialist 162 may analyze data and numbers in order to determine revised provisioning requirements.

The specialist 162 generates a plan that includes a recommendation of a compliment of spares and procurement phasing at 316. Then, at 320, a determination is made of whether the provisioning plan has changed. If the plan has changed, then the IMM planner 160 may review the new plan with the MRO at 324. If the new plan is not approved at 326, then the appropriate issues are communicated at 328 to the specialist 162, and the plan may be revised by the IMM at 318. If the new provisioning plan is approved at 326, then a determination is made at 330 of whether the new plan increases the materials requirements. If the materials requirements have increased, then allocated quantities and reorder points are updated in a system of records at 332 which include an update of material allocated quantities at 334 by the IMM 168. The MEM 166 may adjust inventory bin levels as required at 336 and material allocated quantities are updated at 338 as part of a reporting system 304.

After the allocated quantities and reorder points are updated at 333, a determination is made at 346 of whether the part requires movement from its current location. If the part does not require movement, then the process ends at 348, otherwise the process is continued at 350 by the component transfer module 118.

In the event that the provisioning plan is determined not to have changed at: 320, then the process ends at 322. Lead times are updated by the IMM 168 at 354, and the MEM 166 makes similar updates at 352.

Figure 10:
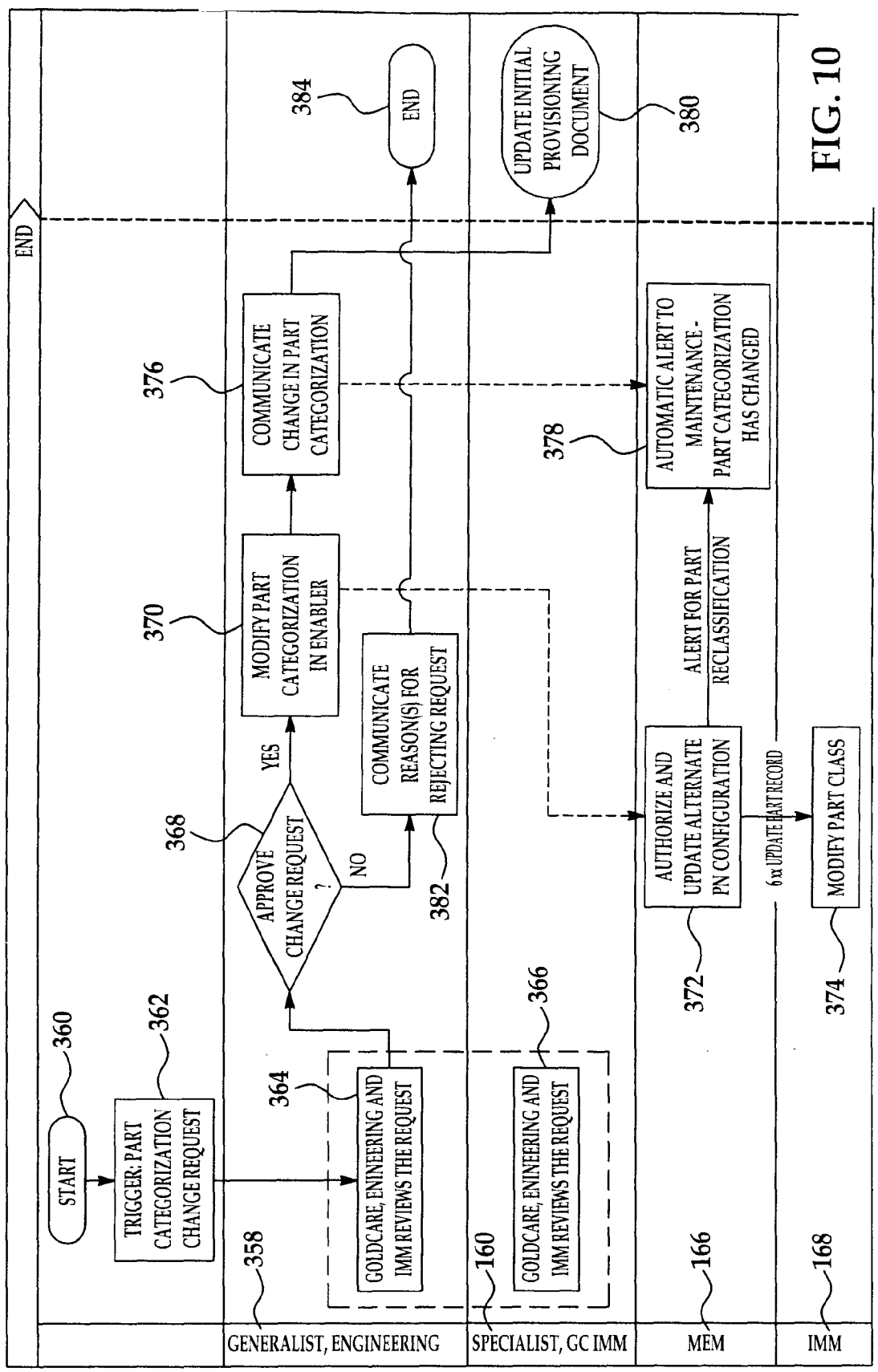
FIG. 10 is a functional block diagram illustrating the materials parts categorization module.

Details of the materials part categorization module 156 are shown in FIG. 10. Responsible parties and systems for the materials parts categorization processes include an IMM specialist 160, MEM 166, IMM 168 and an engineering generalist 358. Starting at 360, the categorization process is triggered at 362 by a part categorization change request. This change request may come from any of various sources, including an MRO, the IMM, the airplane OEM, and other sources. The engineering generalist 358 and the IMM specialist 160 review the request at 364, 366 and a determination is made at 368 of whether to approve the change. If the change is not approved, then the reason for rejecting the request is communicated at 382 and the process ends at 384. If, however, the change request is approved at 368, then the part categorization is modified in the enabler at 370. The MEM 166 then authorizes and updates alternate PN configurations at 372, and the IMM 168 modifies the part class at 374. Next, at 376, the change in part categorization is communicated, and the MEM 166 sends an automatic alert to maintenance advising that the part categorization has changed. Finally, at 380, the initial provisioning document is updated to reflect the part categorization change.

Figure 11A:
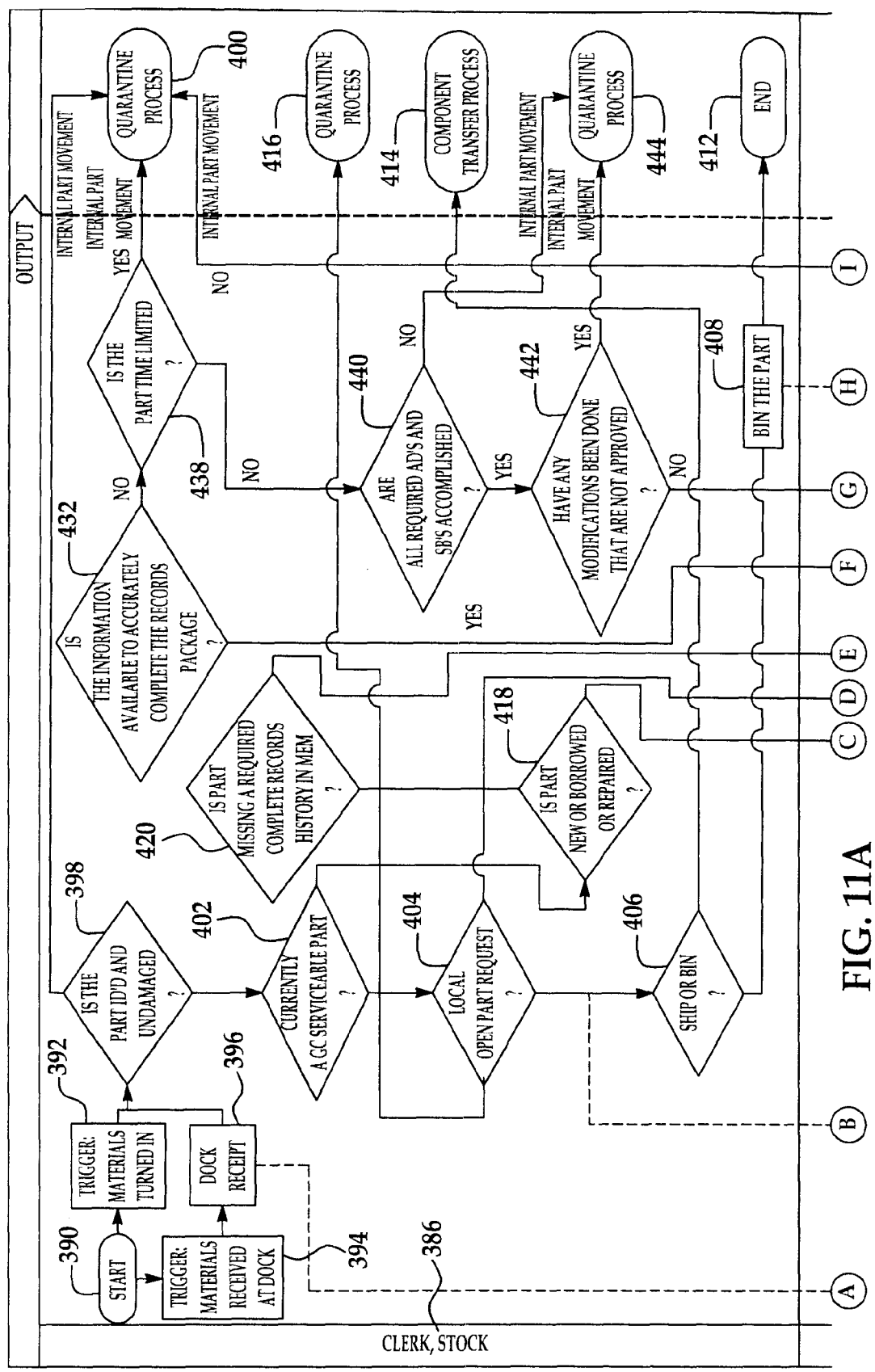
FIGS. 11A and 11B depict a functional block diagram illustrating the materials receiving and inspection module.
Figure 11B:
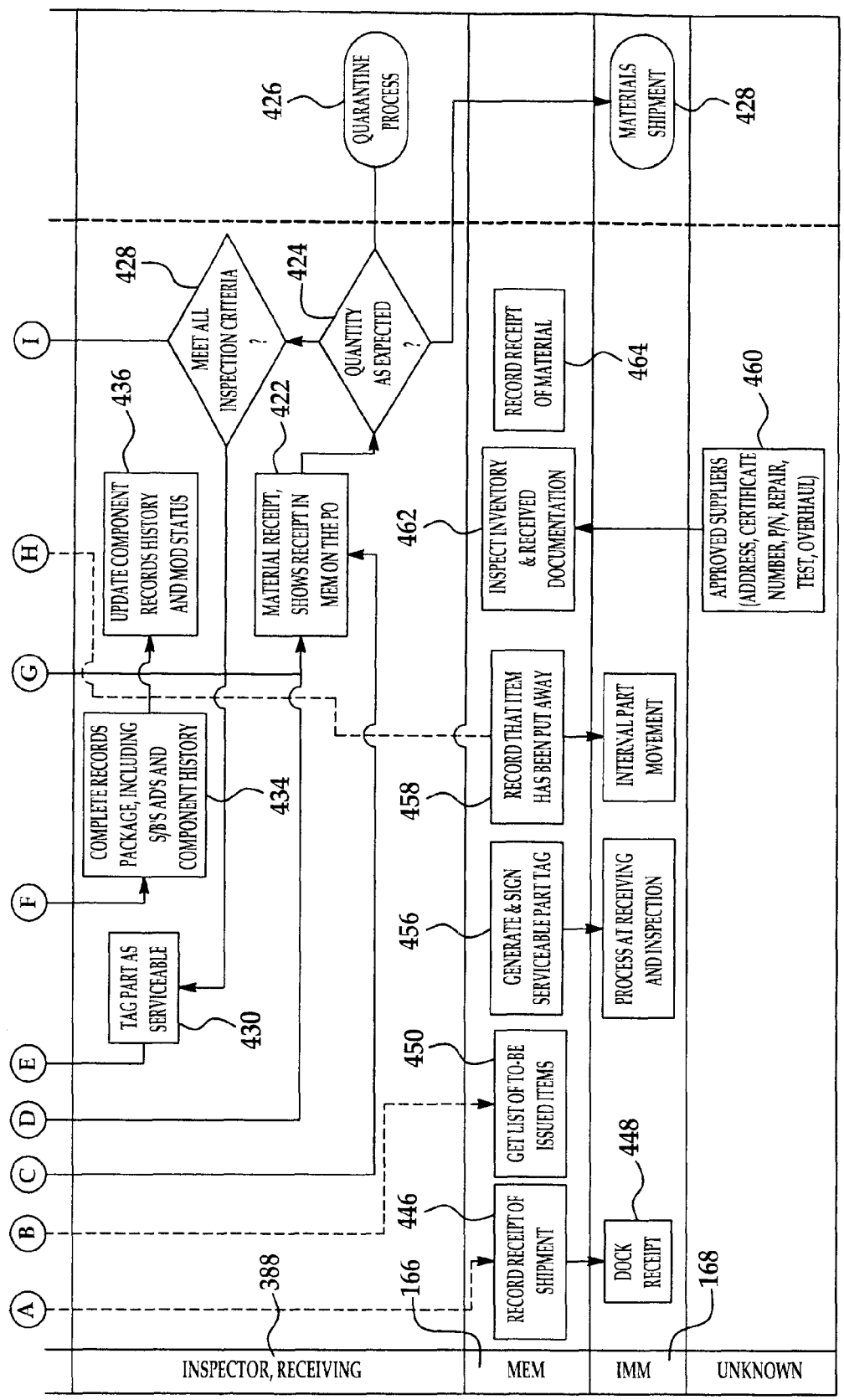

FIG. 11 illustrates further details of the materials receiving and inspection module 140. Processes are controlled by MEM 166, IMM 168 a stock clerk 386 and a receiving inspector 388. Starting at 390, the process is triggered at 394 by materials received at a receiving dock, which results in the production of a dock receipt at 396. Alternatively, the process may be triggered at 392 by materials that have been turned in. At 398, the incoming part or materials are identified and an assessment is made as to whether they are undamaged.

If the incoming materials/parts cannot be identified or are damaged, then they are subjected to the quarantine process at 400. However, if the incoming part/material can be identified and are undamaged, then a determination is made at 402 as to whether the parts/materials are serviceable. If the parts/materials are not serviceable, then a determination is made at 418 of whether the part/material is either new or borrowed, or is a repaired part. If the part is a repaired part, then at 420 a determination is made of whether the part is missing a required record history. If the record history is complete, then the process proceeds to step 422. However, if the records history is incomplete then the process proceeds to step 432 where a determination is made of whether information is available to accurately complete the records package. If information is not available to accurately complete the records package, then a determination is made at 438 of whether the part is time limited, and if the part is time limited then the part is subjected to the quarantine process at 400.

If the part is determined not to be time limited at 438, then a determination is made of whether all required AD's and S/B's have been accomplished. If they not have been accomplished, then the part is subjected to the quarantine process at 444, otherwise the process moves to step 442 where a determination is made of whether any modifications have been performed that have not been approved. If modifications have been performed that are not approved, then the part is subjected to the quarantine process at 444, otherwise the process proceeds to step 422.

If, at step 432, it is determined that sufficient information is available to accurately complete the records package, then the records package, including S/B's and AD's as well as complete component history are completed at step 432. Then, the component records history and modification status is updated at 436 following which the process proceeds to 422.

Returning to step 418, if the part is determined to be either a new or borrowed part, then the process proceeds to step 422 where a material receipt is generated showing receipt by MEM 166 on the purchase order for the part. Next, at 424, a determination is made of whether the quantity of the parts is as expected. If greater than the number of parts have been received, then the process proceeds to the quarantine process at 426, however, if there are fewer than the expected number of parts, then the parts are shipped at 428. If the correct quantity of parts is received at 424, then a determination is made at 428 of whether the received parts meet all inspection criteria. If the parts fail to meet the inspection criteria, then they are subjected to the quarantine process at 444, otherwise the parts are tagged as being serviceable at 430.

Next, a determination is made at 404 of whether an open request for the part exists and if an open request exists, then the part is issued to maintenance at 416. However, if no open requests exist for the part, then a determination is made at 406 as to whether the part should be shipped to a different location, or placed in a bin (inventory). If it is determined that the part should be shipped, then the process proceeds to the component transfer process 414. However if the part is not to be shipped, then the part is placed in the bin at 404 and the process ends 412. When the part is placed in the bin at 408, a record is made at 458 establishing that the part has been put away.

The MEM 166 and IMM 168 coordinate several actions with those taken by the stock clerk 386 and by the receiving inspector 388. For example, issuance of the dock receipt at 396 causes the MEM 166 to record receipt of the shipment, and the dock receipt is recorded by the IMM 168 at 448. Before it is determined whether the part should be shipped or placed in a bin at 406, the MEM 166 produces a list of to-be issued items at 450. The MEM also generates and signs serviceable part tags at 456. The MEM 166 may maintain inventory inspection and receipt records at 462 which include information related to approved suppliers at 460. Finally, the MEM 166 may maintain records of the receipt of materials at 464.

Figure 12:
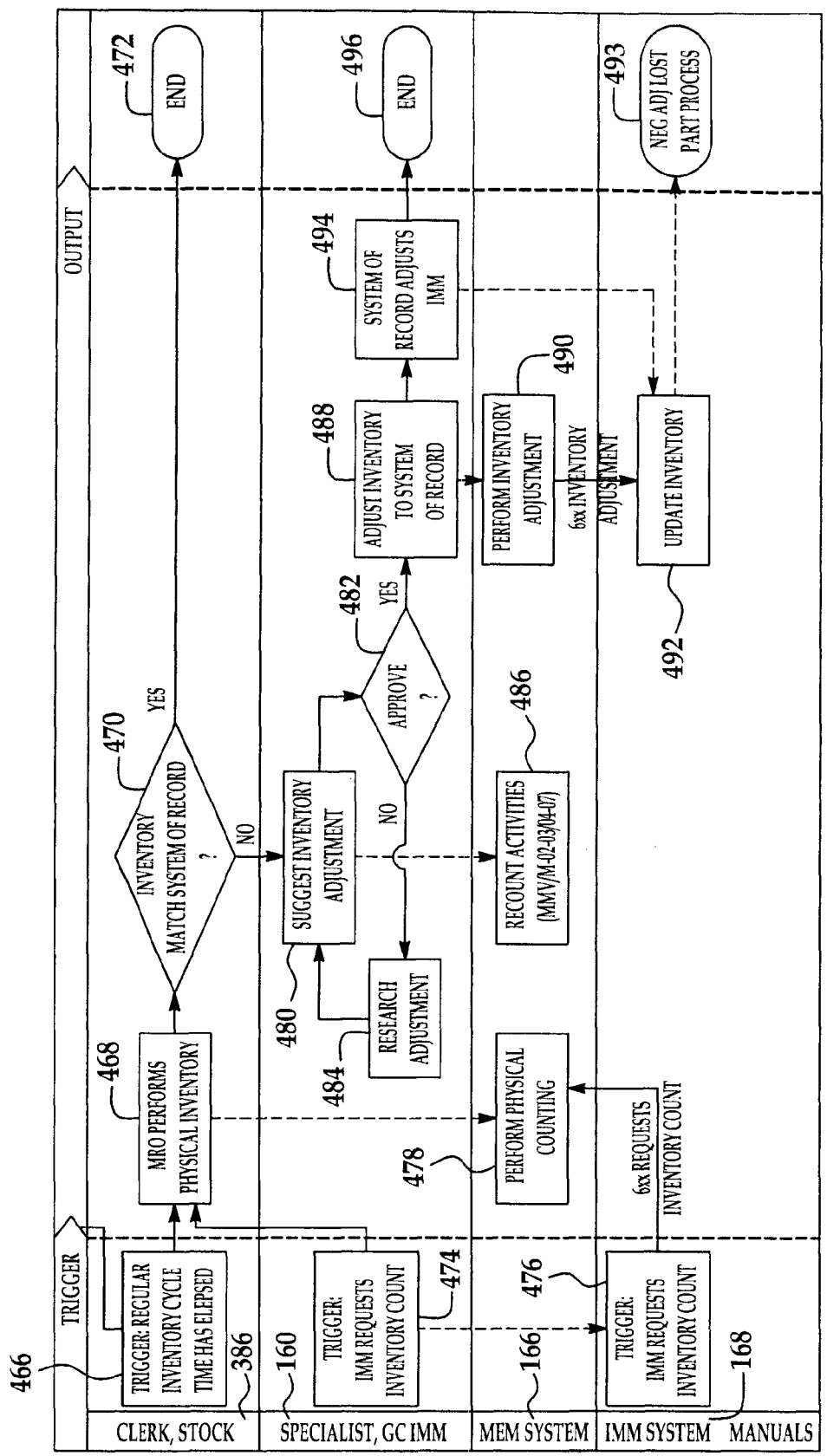
FIG. 12 is a functional block diagram illustrating the materials inventory adjustment module.

Attention is now directed to FIG. 12 which shows further details of the material inventory adjustment module 138. Process flow is controlled by an IMM specialist 160, the MEM system 166, the IMM system 168 and a stock clerk 386. The material inventory adjustment process begins at 466, triggered by elapse of the regular inventory cycle time. The IMM specialist 160 and the IMM system 168 trigger a request for an inventory count at 474 and 476. The request for inventory count is received by the MEM 166, as a request for a physical count at 478. After the MRO performs a physical inventory count at 468, a determination is made at 470 of whether the inventory matches that of system records. If a match is found at 470, the process ends at 472. However, if there is a disparity between the inventory count and the records, then an adjustment to the inventory records is suggested at 480. The suggested adjustment may be approved at 482, in which case the adjustment is carried out at 488, otherwise the purposed adjustment is researched at 484 and a revised adjustment is suggested at 480. The suggested inventory adjustment at 480 may require recount activities at 486 performed by the MEM 166.

Adjustment of the inventory at 488 may involve performing inventory adjustments at 490 within the MEM 166. The adjustments made at 488 may also require corresponding adjustments of records maintained by the IMM 168, as shown at step 494. Adjustments to the IMM records at 494 may require the IMM 168 to update the inventory records at 492, which may result in a negative adjustment to inventory at 493. Following the adjustments made at 488 and 494, the process ends at 496.

Figure 13A:
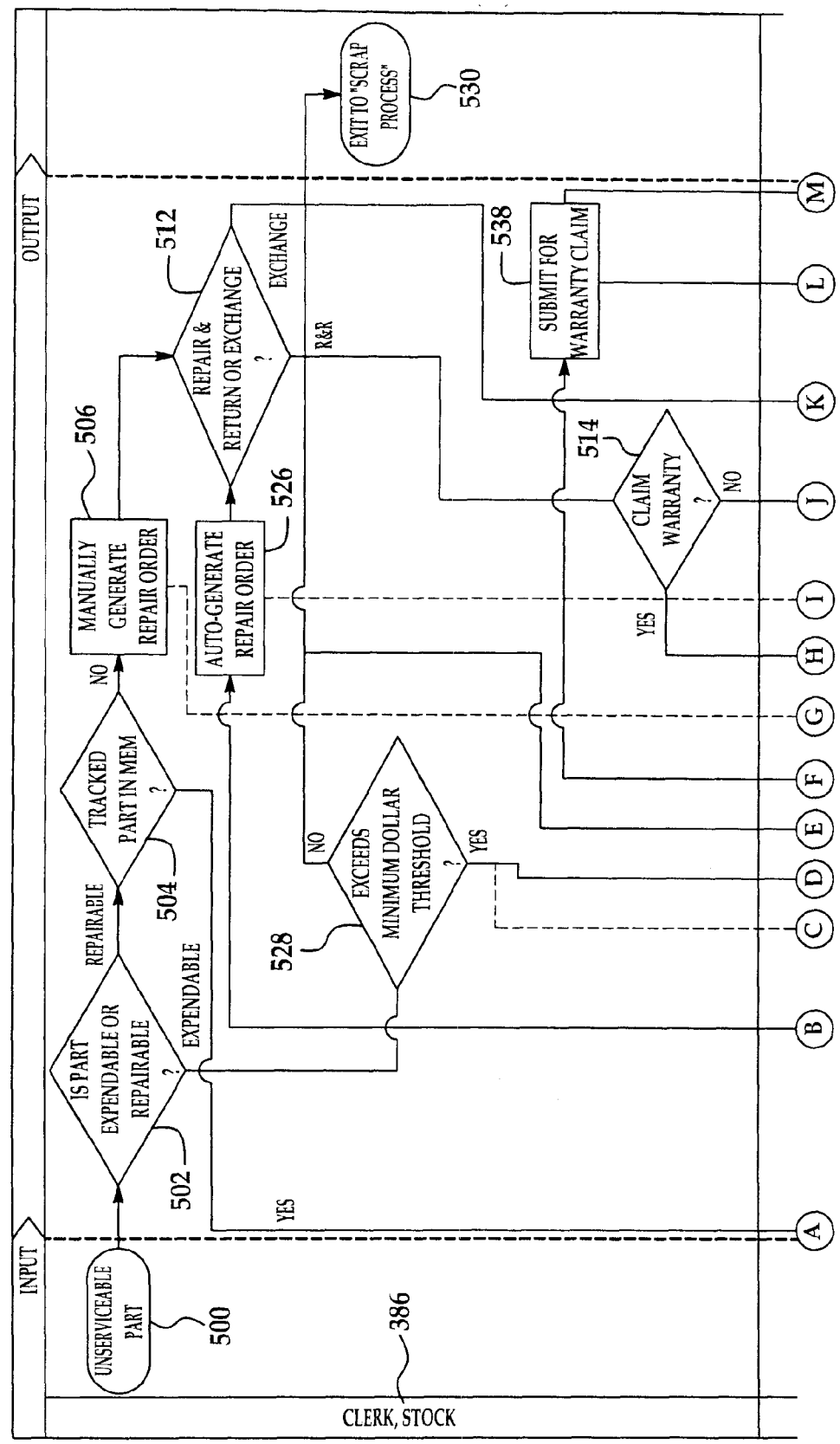
FIGS. 13A and 13B depict a functional block diagram illustrating the materials unserviceable part module.
Figure 13B:
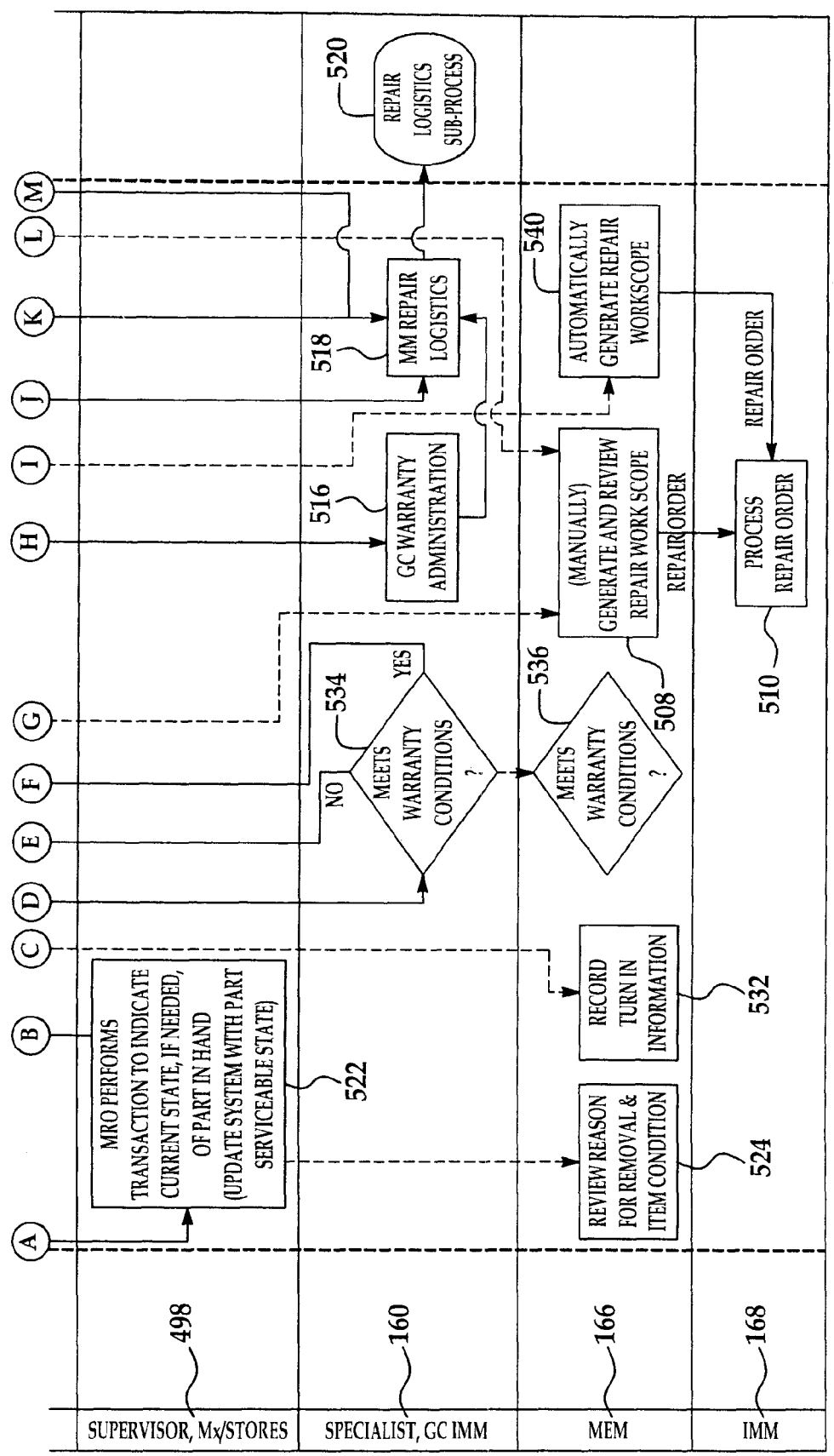

Attention is now directed to FIG. 13 which depicts details of the material unserviceable part module 134 which processes unserviceable parts. The unserviceable parts process may involve actions by an IMM specialist 160, MEM 166, IMM 168, a stock clerk 386, and a supervisor of maintenance stores 498. The subject of the process is an unserviceable part 500. At step 502 a determination is made of whether the unserviceable part is expendable or repairable. If the part is found to be repairable, then a determination is made at 504 of whether it is a part that is tracked in the MEM 166. If the part is not tracked in the MEM 166, then a repair order is manually generated at 506, which triggers the MEM 155 to generate the work scope at 508 and the IMM 168 to process a corresponding work order at 510.

Next, a determination is made of whether the part should be repaired and returned to inventory or service, or exchanged, as shown at step 512. If the part is to be exchanged, then the logistics are established at 518 that are necessary for repairing the part. On the other hand, if it is determined that the part should be repaired and returned, then a determination is made at 514 of whether a warranty claim should be lodged with the supplier. If no warranty claim is lodged, then the logistics are established at 518 to enlist a repair logistics sub-process at 520. Otherwise, if a warranty claim is to be lodged, the matter is referred to warranty administration at 516 before the logistics are established at 518.

Returning to step 504, if the part is one that is tracked by the MEM 166, then the MRO may perform a transaction to indicate the current state, if needed, of the part in hand, as shown at 522. Following the action taken at 522, a repair order is automatically generated at 526 which may require the MEM 166 to automatically generate a repair work scope as shown at 540.

Returning to step 502, in the event that the unserviceable part is an expendable part, then a determination is made at 528 of whether the value of the part exceeds a threshold value. If the part value does not exceed the threshold, then the process proceeds to step 530 where the part is referred to the scrap module 136 for further processing. If, however, the value of the part exceeds the threshold value, then a determination is made at 534 of whether the part meets predefined warranty conditions. If the warranty conditions are met, the part is submitted for a warranty claim at 538, and the necessary logistics for processing the warranty claim are performed at 518. On the other hand, if the part does not meet the conditions at 534, 536, then the part is referred to the scrap module 136, as shown at step 530.

Figure 14:
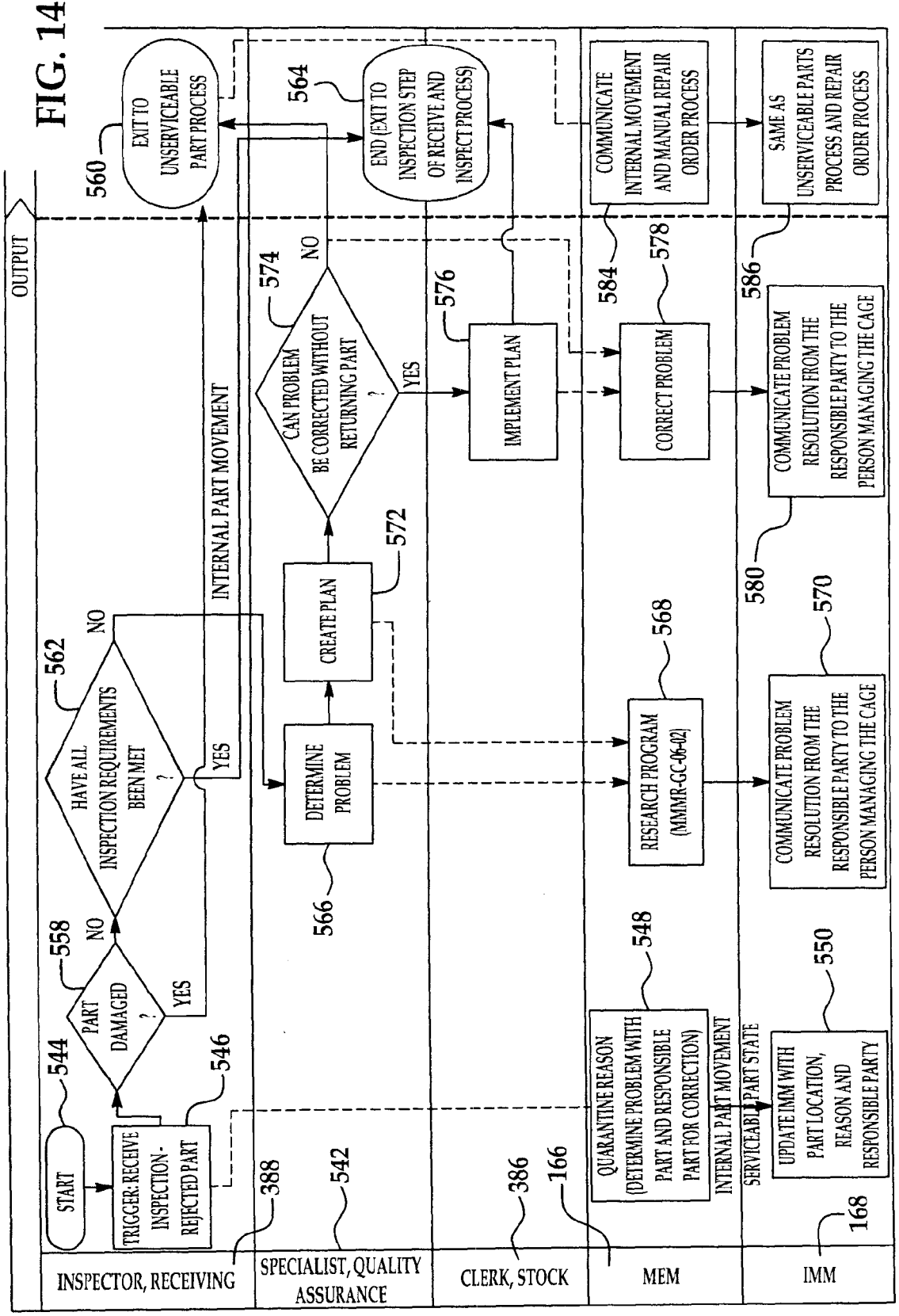
FIG. 14 is a functional block diagram illustrating the materials quarantine module.

Referring now to FIG. 14 the materials quarantine module 132 involves processes performed by the MEM 166, IMM 168, a stock clerk 386, a receiving inspector comp 388, and a quality assurance specialist 542. The materials quarantine process starts at 544 and is triggered at 546 by the receipt of a part that has been rejected as a result of an inspection. A determination is made at 558 of whether the part is damaged. If the part is determined to be damaged, then it is referred to the unserviceable parts module 134, as shown at step 560. However, if the part is found to be undamaged, then a determination is made at 562 of whether all of the inspection requirements have been met. If all inspection requirements have been met, then the quarantine process ends at 564 and further processing of the part may be possible by the materials receiving and inspection module 140.

Returning to step 562, if not all inspection requirements have been met, then the problem with the part is determined at 566. Determination of the problem may require research at 568, and the IMM 168 may communicate the problem resolution from the responsible party to the person managing the inventory stock, as shown at 570.

After the problem with the part is determined at 566, a plan for resolving the problem is created at 572 and a determination is then made at 574 of whether the problem can be corrected without returning the part. If it is not possible to correct the problem with the part without returning it, then the quarantine process is exited at 560. However, if the problem with the part is one that can be corrected, then a plan for correcting the problem is implemented at 576, following which the part is returned for processing by the materials receiving and inspection module 140. Implementation of the plan at 576 may require the MEM 166 to correct the problem at 578, following which the IMM 168 may communicate problem resolution from the responsible party to the person managing the inventories. The MEM 166 may communicate internal movements and manual repair order processes at 584, and the IMM 168, and the IMM 168 may make record adjustments at 586.

Figure 15:
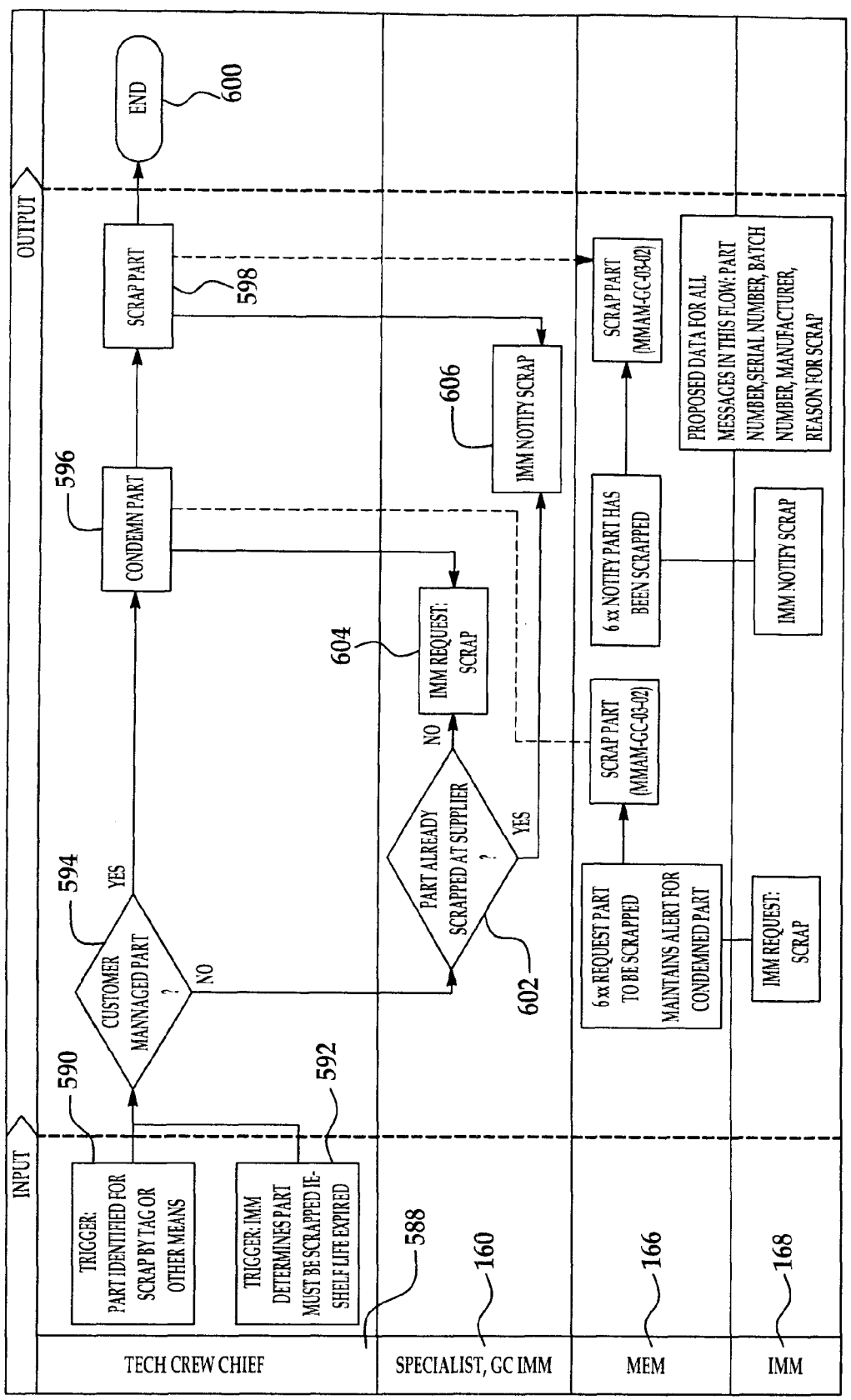
FIG. 15 is a functional block diagram illustrating the scrap module.

A general flow diagram for processes performed in the scrap module 136 are shown in FIG. 15. The scrap process may involve action taken by the IMM specialist 160, MEM 166, IMM 168 and a technical crew chief 588. The scrap process may be triggered at 590 by c part that has been identified for scrap by a tag or other means. Alternatively, the process may be triggered at 592 by an IMM determination that the part must be scrapped, as, for example and without limitation, where the shelf life of the part has expired.

Next, a determination is made at 594 of whether the part is one that is managed by the customer. If the part is a customer managed part, then the part is condemned at 596, and then scrapped at 598, following which the process ends at 600. However if the part is not a customer part, then a determination is made at 602 of whether the part has already been scrapped by the supplier. If the part has not been scrapped by the supplier, then the IMM 168 may request that the part be scrapped, as shown at step 604. However, if the part has already been scrapped by the supplier, then the scrap status is reflected in the IMM as shown at step 606.

Figure 16:
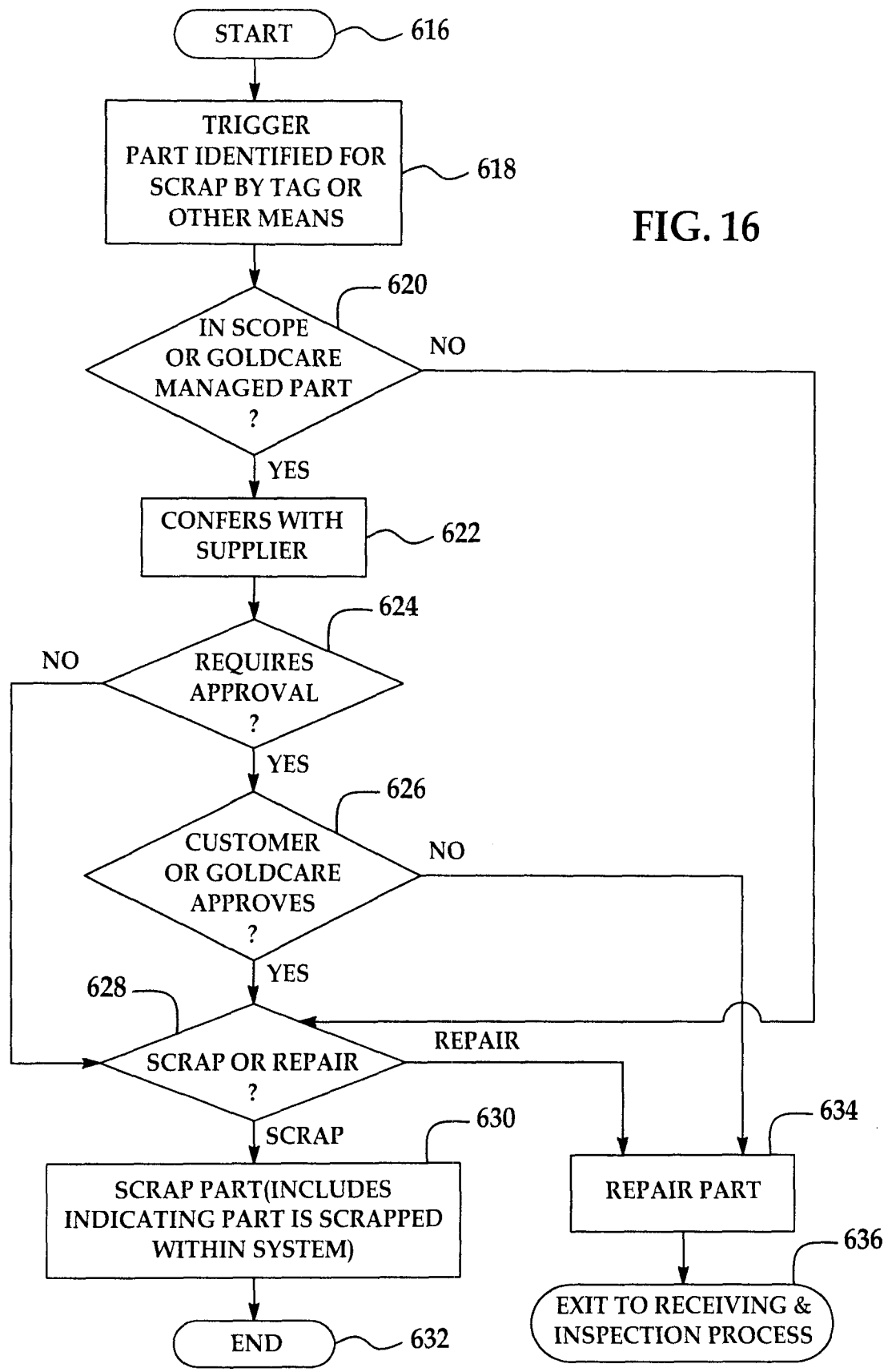
FIG. 16 is a functional block diagram illustrating the scrap process for repairable parts.

Attention is now directed to FIG. 16 which illustrates the process for scrapping repairable parts. The process starts at 616 and is triggered at 618 by receipt of a part that has been identified for scrap by a tag or other means. At 620, a determination is made of whether the part is one that is managed by the network, and if the part is not managed by the network then the process proceeds to step 628. However, if the part is one that is managed by the network, then the part supplier may be conferred regarding the repair. Then, a determination is made at 624 of whether any approvals are required before the part is scrapped or repaired. For example, disposition of the part may require approval by the customer or the network, as shown at 626.

A decision is made at 628 of whether to scrap or repair the part. If it is determined that the part is to be repaired, then the part is repaired at 634 and, as shown at step 636 the repaired part is then processed by the receiving and inspection module 140. Alternatively, if it is determined that the part should be scrapped at 628, then the part is scrapped at 630, system records are noted accordingly, and the process ends at step 632.

FIG. 17 illustrates the steps of a process for scrapping rotable parts. The process starts at 638 and is triggered at 640 by a part that has been identified for scrap either by a tag or other means. A determination is then made at 642 of whether the part is one that is managed by the IMM network. If the part is one that is managed by the IMM network, then the process ends at 604, otherwise, a determination is made at 646 of whether the part is managed by the IMM or by the customer. If the part is managed by the IMM, then the IMM confers with the supplier at 648 regarding whether the part should be scrapped or repaired. If the part is one that is managed by the customer, then the customer may confer with the supplier at 650.

At step 652, a determination is made of whether the part should be repaired or scrapped. If it is determined at 652 that the part should be repaired, the part is repaired at 654, and at 656 the repaired part is referred to the receiving and inspection module 140 for further processing. If it is determined that the part should be scrapped, then the part is scrapped at 658 and the process ends at 660.

FIG. 18 illustrates the steps of a process for scrapping expendable parts. The process starts at 662 and is triggered at 664 by a part that has been identified for scrap either by a tag or other means. A record is made of the scrapped part at 666, and the process then ends at 668.

Figure 19:
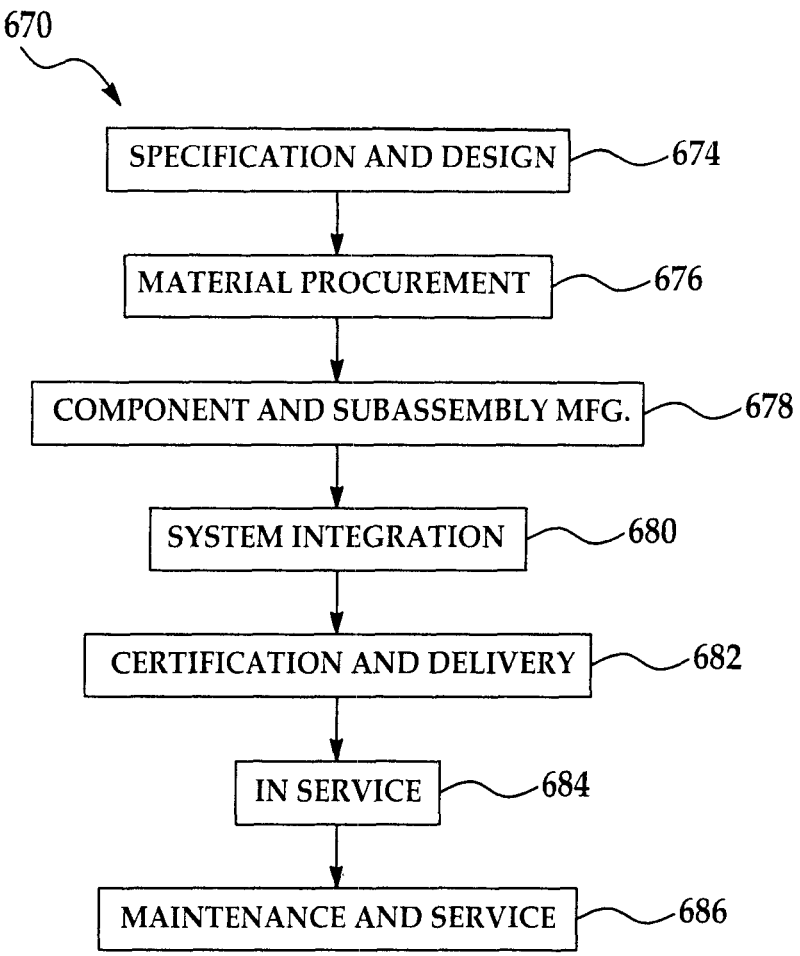
FIG. 19 is a flow diagram of aircraft production and service methodology.
Figure 20:
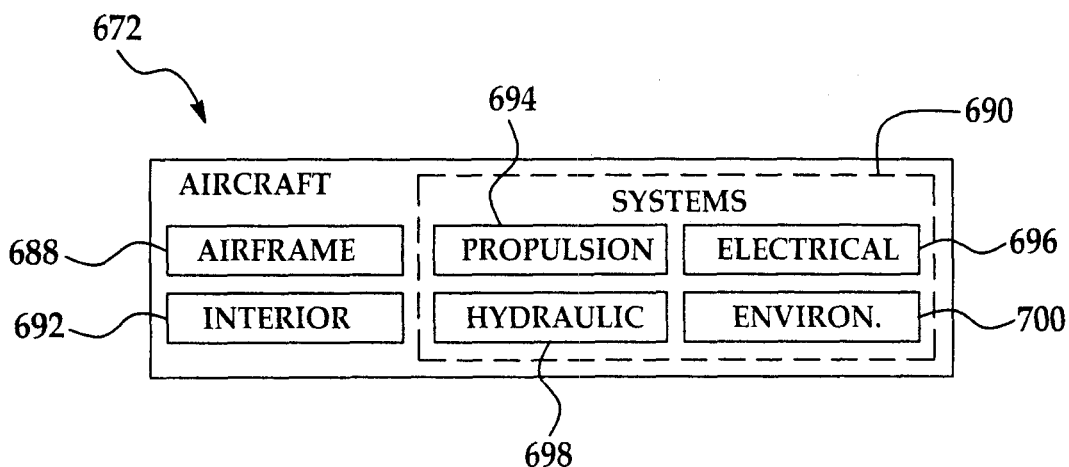
FIG. 20 is a block diagram of an aircraft.

Embodiments of the disclosure may find use in a variety of potential applications, particularly in the transportation industry, including for example, aerospace and automotive applications. Thus, referring now to FIGS. 19 and 20, embodiments of the disclosure may be used in the context of an aircraft manufacturing and service method 670 as shown in FIG. 19 and an aircraft 672 as shown in FIG. 20. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 670 may include specification and design 674 of the aircraft 672 and material procurement 676. During production, component and subassembly manufacturing 678 and system integration 680 of the aircraft 672 takes place. Thereafter, the aircraft 670 may go through certification and delivery 120 in order to be placed in service 684. While in service by a customer, the aircraft 670 is scheduled for routine maintenance and service 686 (which may also include modification, reconfiguration, refurbishment, and so on).

Each of the processes of method 670 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 672 produced by exemplary method 670 may include an airframe 688 with a plurality of systems 690 and an interior 692. Examples of high-level systems 690 include one or more of a propulsion system 694, an electrical system 696, a hydraulic system 698, and an environmental system 700. Any number of other systems may be included. Although an aerospace example is shown, the principles of the disclosure may be applied to other industries, such as the automotive industry.

Apparatus and methods embodied herein may be employed during any one or more of the stages of the production and service method 108. For example, components or subassemblies corresponding to production process 670 may be fabricated or manufactured in a manner similar to components or subassemblies produced while the aircraft 672 is in service. Also, one or more apparatus embodiments, method embodiments, or a combination thereof may be utilized during the production stages 678 and 680, for example, by substantially expediting assembly of or reducing the cost of an aircraft 670. Similarly, one or more of apparatus embodiments, method embodiments, or a combination thereof may be utilized while the aircraft 670 is in service, for example and without limitation, to maintenance and service 686.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of managing a pooled inventory of parts held at differing locations and used in maintenance of multiple fleets of aircraft, the method comprising:

generating a request for a part to a material request module used in the maintenance of an aircraft;

determining by the material request module whether the requested part is in the pooled inventory by determining whether the requested part is being held in an inventory at a location where maintenance is to be performed;
reserving the requested part determined to be held at the location where the maintenance is to be performed;
associating a unique identifier of the aircraft with the reserved part;
if the requested part is determined to be in the pooled inventory, generating a logistical plan by a material transfer module for moving the part to the location where the maintenance is to be performed on the aircraft; and
if the requested part is determined not to be in the pooled inventory, ordering the requested part by a material shipment module from a supplier, wherein at least one of the material request module, the material transfer module, or the material shipment module is executed via a processor.

2. The method of claim 1, wherein the unique identifier is at least one of a tail number, a registration number, or a certification number.

3. The method of claim 1, wherein ordering the requested part from the supplier includes issuing an order to a parts supplier to send the requested part to the location where the maintenance is to be performed on the aircraft.

4. The method of claim 1, further comprising:
removing a part on the aircraft corresponding to the requested part;
replacing the removed part with the requested part; and
determining whether the removed part is one of expendable or repairable.

5. The method of claim 4, further comprising:
if the removed part is determined to be expendable, determining whether the removed part satisfies a set of warranty conditions requiring a supplier to replace the removed part when the removed part is determined to be expendable.

6. The method of claim 5, further comprising:
determining the value of the removed part, and
wherein determining whether the removed part satisfies the set of warranty conditions requiring the supplier to replace the removed part is performed only when the determined value of the removed part exceeds a preselected value.

7. A system for managing a pooled inventory of material held at differing locations and used in maintenance of multiple fleets of aircraft, comprising:
a material request module to process requests for material and to determine whether the requested material is present at one of the locations;
a material transfer module responsive to material requests to transfer parts between the differing locations;
a material receiving and inspection module to receive and inspect the material;
a material quarantine module to quarantine material received and inspected by the material receiving and inspection module; and
a material shipment module to manage the shipment of material from a supplier in response to a material request, wherein at least one of the material request module, the material transfer module, the material receiving and inspection module, the material quarantine module, or the material shipment module is executed via a processor.

8. The system of claim 7, further comprising a material scrap module to scrap material received and inspected by the material receiving and inspection module.

9. The system of claim 7, further comprising a material provisioning module to determine the material required for maintenance of aircraft at the locations.

10. A method of managing a pooled inventory of parts held at differing locations and used in maintenance of multiple fleets of aircraft, the method comprising:
generating a request to a material request module for a part used in maintenance of an aircraft;
determining by the material request module whether the requested part is in the pooled inventory by determining whether the requested part is being held in an inventory at a location where the maintenance is to be performed;
if the requested part is determined to be in the pooled inventory:
 if the part is not at the location where the maintenance is to be performed, generating logistics by a material transfer module for moving the part to the location where the maintenance is to be performed; and
 if the requested part is being held in the inventory at the location where the maintenance is to be performed, reserving by the material request module the requested part at the location where the maintenance is to be performed, and associating a number associated with the aircraft with the reserved part;
if the requested part is determined not to be in the pooled inventory, ordering a supplier by a material shipment module to ship the requested part to the location where the maintenance is to be performed on the aircraft;
removing a part on the aircraft and replacing the removed part with the requested part;
determining whether the removed part is expendable or repairable;
if the removed part is determined to be expendable, determining by a material quarantine module whether the removed part satisfies a set of warranty conditions requiring a supplier to replace the removed part; and
determining a value of the removed part, wherein determining by the material quarantine module whether the removed part satisfies the set of warranty conditions is performed only if the determined value of the removed part exceeds a preselected value, wherein at least one of the material request module, the material transfer module, the material shipment module or the material quarantine module is executed via a processor.

11. A system for managing a pooled inventory of material held at differing locations and used in maintenance of multiple fleets of aircraft, comprising,
a material request module to process requests for material and to determine whether the requested material is present at one of the locations;
a material transfer module responsive to material requests to transfer parts between the differing locations;
a material receiving and inspection module to receive and inspect the material;
a material shipment module to manage shipment of material from a supplier in response to a material request;
a material quarantine module to quarantine material received and inspected by the material receiving and inspection module;
a material scrap module to scrap material received and inspected by the material receiving and inspection module;
a material inventory adjustment module to adjust records reflecting the pooled inventory; and a material provisioning module to determine the material required for maintenance of aircraft at each of the locations, wherein at least one of the material request module, the material transfer module, the material receiving and inspection module, the material shipment module, the material quarantine module, the material scrap module, the material inventory adjustment module, or the material provisioning module is implemented via a processor.

* * * * *